(12) United States Patent
Chen et al.

(10) Patent No.: US 10,466,835 B2
(45) Date of Patent: Nov. 5, 2019

(54) DISPLAY METHOD AND DISPLAY CONTROL APPARATUS

(71) Applicant: FUJITSU LIMITED, Kawasaki-shi, Kanagawa (JP)

(72) Inventors: Bin Chen, Machida (JP); Yusuke Yasukawa, Yokohama (JP); Yoshihiko Murakawa, Yokohama (JP); Keiju Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 15/709,700

(22) Filed: Sep. 20, 2017

(65) Prior Publication Data

US 2018/0011592 A1    Jan. 11, 2018

Related U.S. Application Data

(63) Continuation of application No. PCT/JP2015/059707, filed on Mar. 27, 2015.

(51) Int. Cl.

| | | |
|---|---|---|
| *G06F 3/041* | (2006.01) | |
| *G06F 3/0486* | (2013.01) | |
| *G06F 3/0488* | (2013.01) | |
| *G06F 3/14* | (2006.01) | |
| *G06F 3/0481* | (2013.01) | |

(Continued)

(52) U.S. Cl.
CPC .......... *G06F 3/0416* (2013.01); *G06F 3/0486* (2013.01); *G06F 3/04815* (2013.01); *G06F 3/04883* (2013.01); *G06F 3/04886* (2013.01); *G06F 3/147* (2013.01); *G06F 3/1423* (2013.01); *G06F 3/1454* (2013.01); *G09G 5/14* (2013.01); *G06F 2203/04803* (2013.01); *G06F 2203/04808* (2013.01)

(58) Field of Classification Search
CPC ............................ G06F 2203/048; G09G 5/14
See application file for complete search history.

(56) References Cited

U.S. PATENT DOCUMENTS

| | | |
|---|---|---|
| 6,970,145 B1 | 11/2005 | Aoki |
| 2006/0007242 A1 | 1/2006 | Hill et al. |

(Continued)

FOREIGN PATENT DOCUMENTS

| | | | |
|---|---|---|---|
| EP | 2 849 052 A1 | 3/2015 | |
| GB | 1503405.1 | * 4/2015 | ......... G06F 3/04883 |

(Continued)

OTHER PUBLICATIONS

International Search Report dated Jun. 9, 2015 in PCT/JP2015/059707 filed Mar. 27, 2015.

(Continued)

*Primary Examiner* — Priyank J Shah
(74) *Attorney, Agent, or Firm* — Xsensus LLP

(57) ABSTRACT

A disclosed display method includes: projecting data of a space that includes a first display provided by a first display device to a perspective view; causing a second display device to display the perspective view on a second display; accepting a designation of a first position on the second display; converting the first position into a second position on the first display, upon detecting that the first position is inside an area that corresponds to the first display; and operating an image displayed on the first display based on the second position.

3 Claims, 33 Drawing Sheets

(51) Int. Cl.
*G06F 3/147* (2006.01)
*G09G 5/14* (2006.01)

(56) References Cited

U.S. PATENT DOCUMENTS

| | | | |
|---|---|---|---|
| 2007/0041056 A1* | 2/2007 | Wakai | G06F 3/1431 358/448 |
| 2008/0005702 A1 | 1/2008 | Skourup et al. | |
| 2011/0249024 A1 | 10/2011 | Arrasvuori et al. | |
| 2012/0005630 A1* | 1/2012 | Ohba | G06F 3/1462 715/853 |
| 2012/0124509 A1 | 5/2012 | Matsuda et al. | |
| 2014/0071099 A1 | 3/2014 | Kubota et al. | |
| 2014/0223323 A1* | 8/2014 | Kasahara | G06F 3/1423 715/740 |
| 2014/0282066 A1 | 9/2014 | Dawson et al. | |
| 2015/0020013 A1 | 1/2015 | Kim et al. | |
| 2015/0077356 A1 | 3/2015 | Choi et al. | |
| 2018/0032301 A1* | 2/2018 | Jeacocke | G06F 3/04883 |

FOREIGN PATENT DOCUMENTS

| | | |
|---|---|---|
| JP | 9-282125 | 10/1997 |
| JP | 2001-147679 | 5/2001 |
| JP | 2004-356803 | 12/2004 |
| JP | 2005-107681 | 4/2005 |
| JP | 2006-072323 | 3/2006 |
| JP | 2011-028309 | 2/2011 |
| JP | 2014-053795 | 3/2014 |
| WO | WO 2013/073100 A1 | 5/2013 |

OTHER PUBLICATIONS

Written Opinion dated Jun. 9, 2015 in PCT/JP2015/059707 filed Mar. 27, 2015 (with English Translation).

Extended European Search Report dated Feb. 16, 2018 in European Patent Application No. 15887469.3, 6 pages.

European Examination Report dated Jun. 26, 2019, issued in corresponding European Patent Application No. 15 887 469.3.

* cited by examiner

DISPLAY METHOD AND DISPLAY CONTROL APPARATUS

CROSS-REFERENCE TO RELATED APPLICATIONS

This application is a continuing application, filed under 35 U.S.C. section 111(a), of International Application PCT/JP2015/059707, filed on Mar. 27, 2015, the entire contents of which are incorporated herein by reference.

FIELD

This invention relates to a technique for controlling plural display devices.

BACKGROUND

When plural display surfaces are not continuous in a multi-display system, it is difficult to perform a drag operation across the display surfaces.

In addition, the plural display surfaces in the multi-display system are not necessarily arranged on the same plane. A document discloses an example in which display surfaces are arranged on a front and side walls. As described here, it is more difficult to perform a drag operation across the display surfaces orthogonal to each other.

It is complicated to operate images displayed on the plural display surfaces on respective display surfaces.

Patent Document 1: Japanese Laid-open Patent Publication No. 9-282125

Patent Document 2: Japanese Laid-open Patent Publication No. 2006-72323

Patent Document 3: Japanese Laid-open Patent Publication No. 2005-107681

SUMMARY

A display method related to one aspect includes: projecting data of a space that includes a first display provided by a first display device to a perspective view; causing a second display device to display the perspective view on a second display; accepting a designation of a first position on the second display; converting the first position into a second position on the first display, upon detecting that the first position is inside an area that corresponds to the first display; and operating an image displayed on the first display based on the second position.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

[Embodiment 1]

Figure 1:
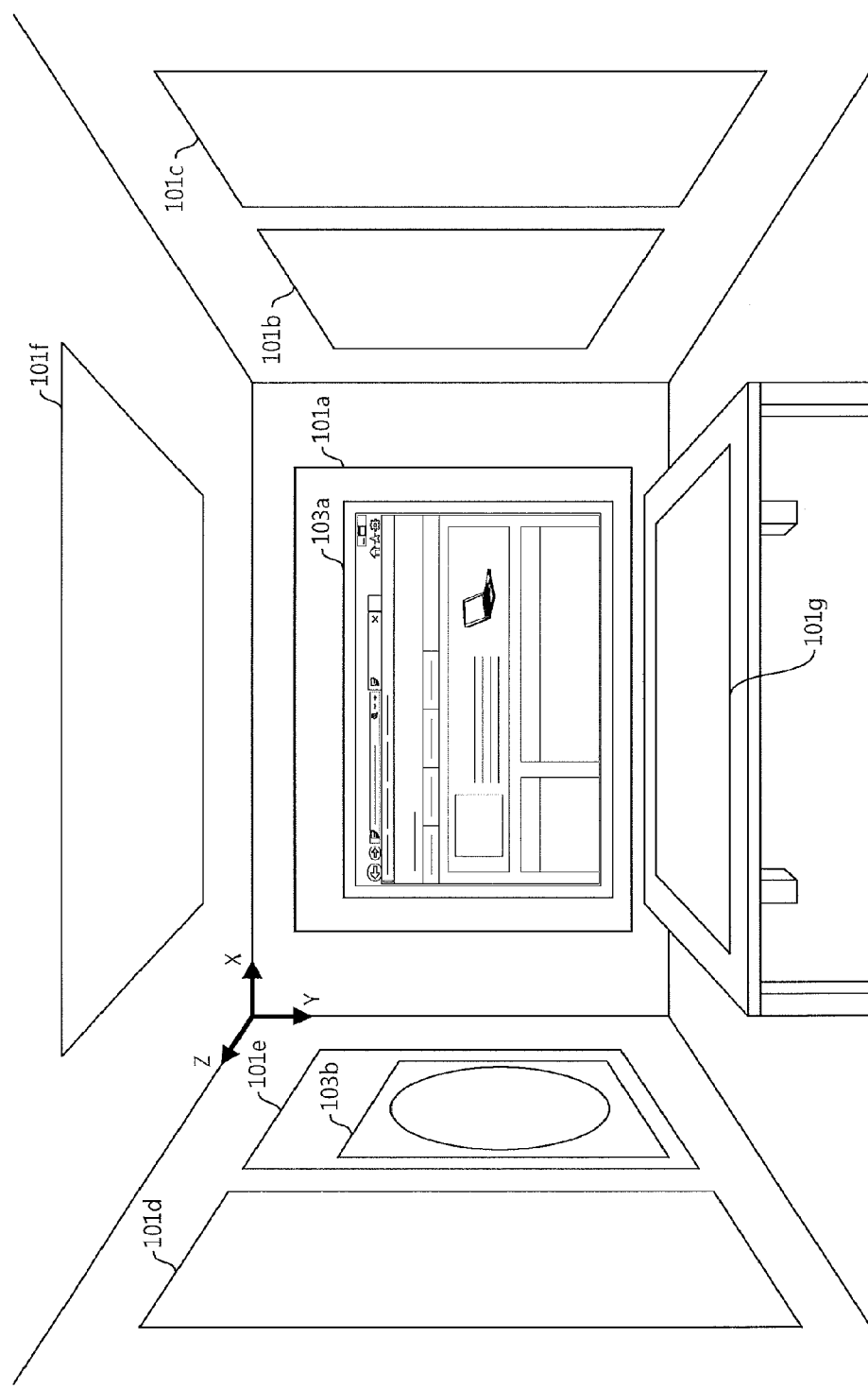
FIG. 1 is a diagram depicting an example of arrangement of display surfaces.

FIG. 1 illustrates an example of arrangement of display surfaces 101. In this example, each of seven display devices is set on a wall surface, a ceiling or a table of a room. In other words, the display surfaces 101a to 101g provided by each display device are logically arranged on a wall surface, a ceiling or a table. The positions of these display surfaces 101a to 101g are specified by a global coordinate system. In this example, an upper-left end of a front is a reference point of the global coordinate system. The right direction is a positive direction of an X axis. The downward direction is a positive direction of a Y axis. The front direction is a positive direction of a Z axis.

Devices that provide the display surfaces 101 are not limited to display devices. When a projector device for projecting an image on a screen is used, the screen corresponds to the display surface 101.

FIG. 1 illustrates an example of display in a normal mode. A screen displayed on the display surface 101 in the normal mode is called an original screen. The original screen of the display surface 101a includes a window 103a in which a browser screen is displayed. The original screen of the display surface 101e includes a window 103b in which an image of a circle is rendered.

Figure 2:
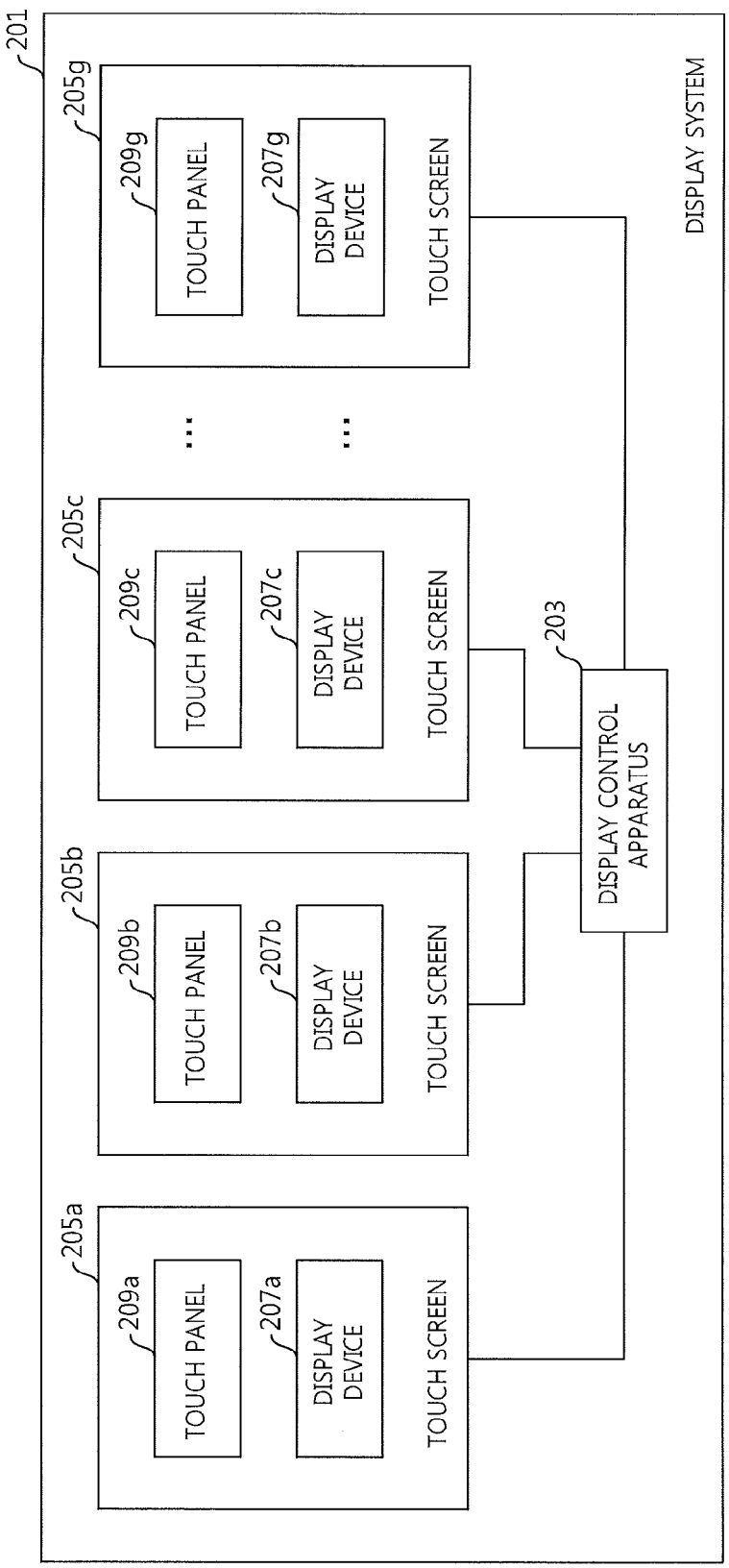
FIG. 2 is a diagram depicting an example of configuration of a display system.

FIG. 2 illustrates an example of a configuration of a display system 201. The display system 201 includes a display control apparatus 203 and plural touch screens 205. The display control apparatus 203 is connected to touch screens 205a to 205g. The touch screen 205 has a display device 207 and a touch panel 209. The display device 207 displays an image on the display surface 101. As described above, an apparatus that provides the display surface 101 may be a projector apparatus. The touch panel 209 detects a touch operation on the display surface 101. A touch operation may be detected using a plane scan sensor instead of the touch panel. Moreover, an image captured by a camera may be analyzed to detect a touch operation. Moreover, instead of the touch screen 205, a terminal (for example, a notebook computer, a tablet terminal, a smartphone, or the like) having the display device 207 and the touch panel 209 may be used. The touch screens 205a to 205g (in the figure, the touch screens 205d to 205f are omitted) correspond to the display surfaces 101a to 101g, respectively.

Figure 3:
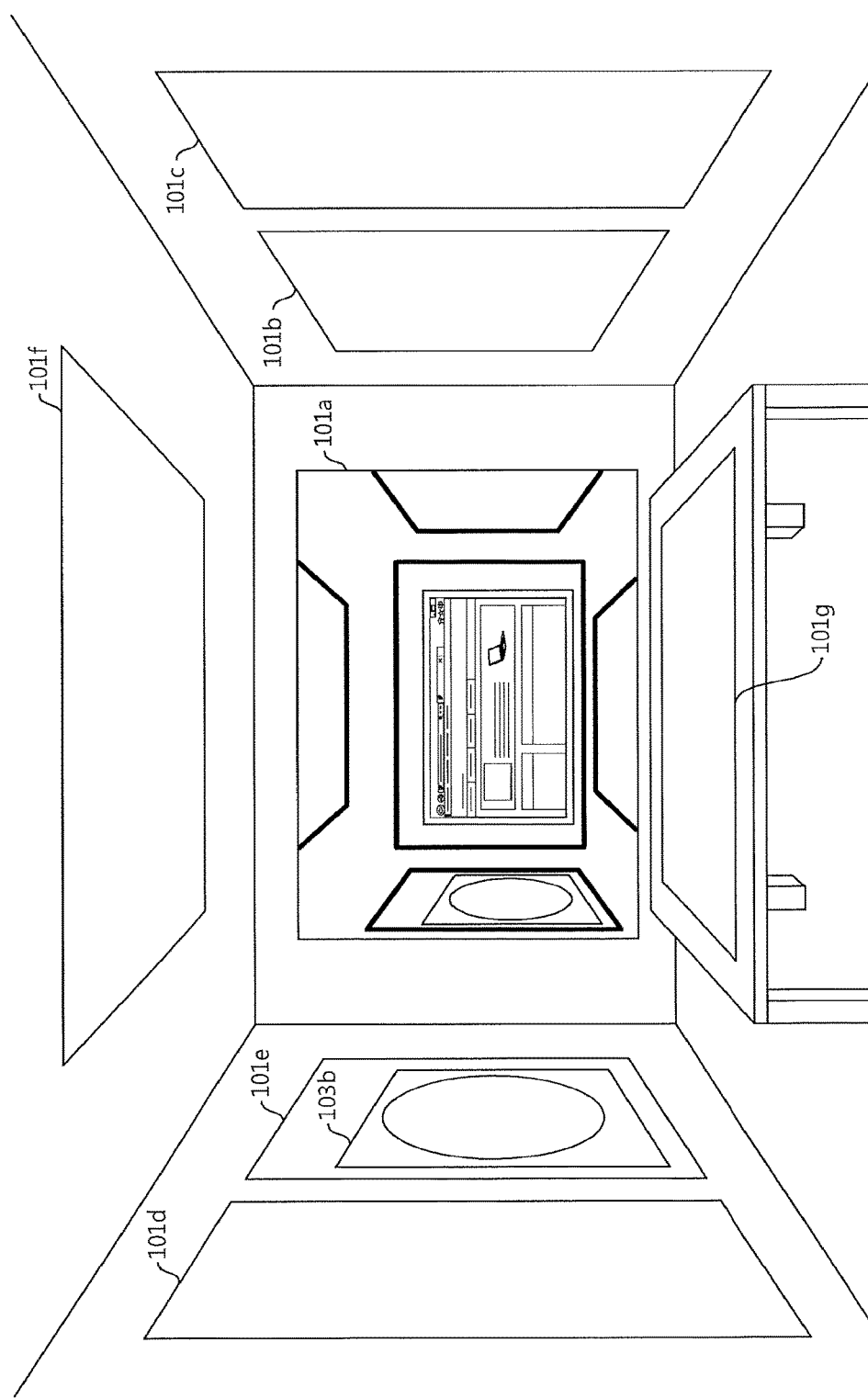
FIG. 3 is a diagram depicting an example of display of an operation screen.

FIG. 3 illustrates an example of display of an operation screen. In a projection mode, the operation screen is displayed on the display surface 101a. On the operation screen, a perspective view of the room is rendered. Then, on the operation screen, an operation instruction is accepted from a user. The display device 207 for displaying the operation screen may be referred to as a control display. The display device 207 other than the control display may be referred to as a member display. In this example, the display device 207a is the control display and the display devices 207b to 207g are the member displays.

Figure 4:
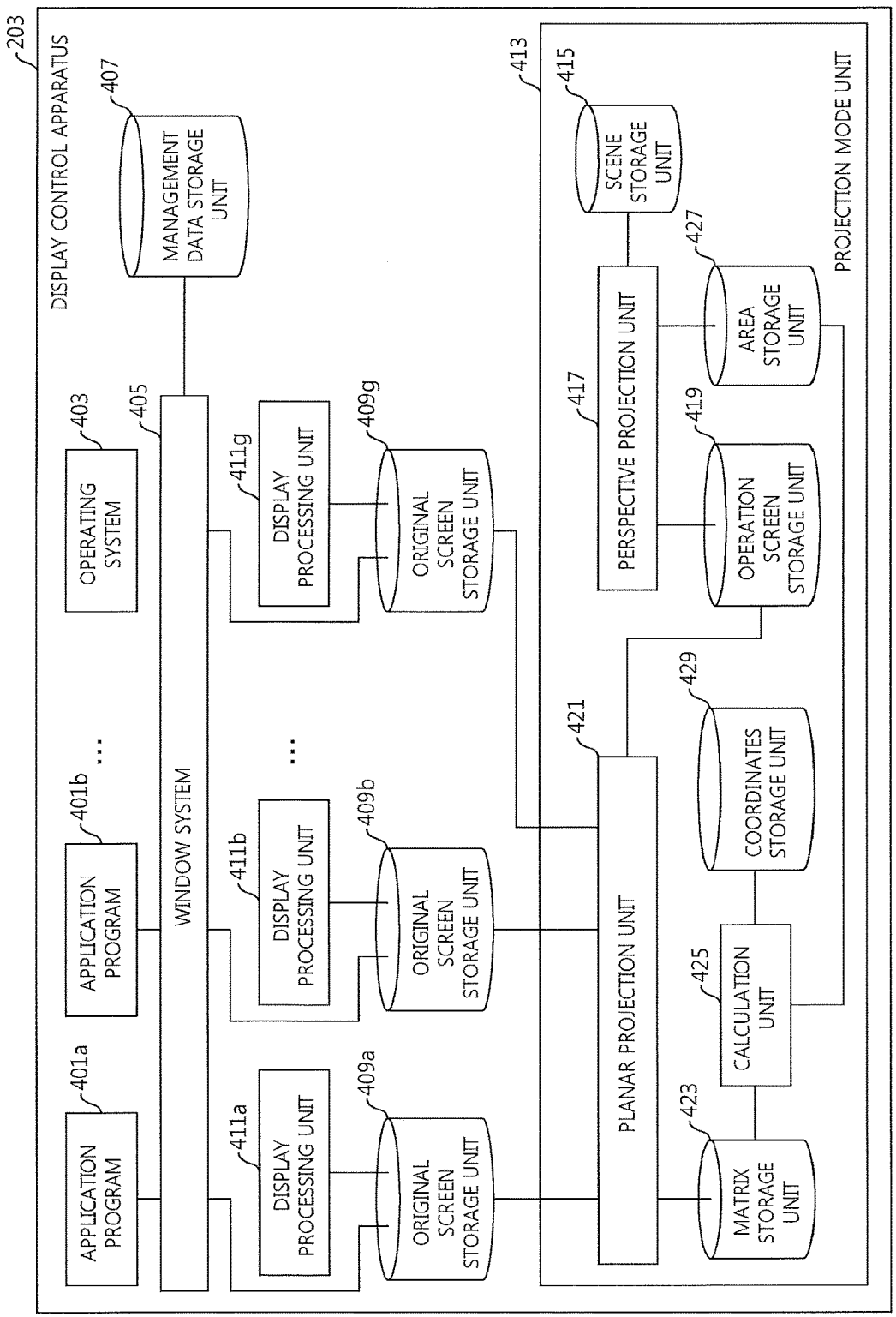
FIG. 4 is a diagram depicting an example of a module configuration of a display control apparatus.

FIG. 4 illustrates an example of a module configuration of the display control apparatus 203. The display control apparatus 203 has application programs 401, an operating system 403, a window system 405, a management data storage unit 407, original screen storage units 409, display processing units 411, and a projection mode unit 413.

It is assumed that application program 401a provides window 103a. It is assumed that application program 401b provides window 103b. The operating system 403 detects a touch position on the touch panel 209, for example. The window system 405 controls a window. The management data storage unit 407 stores data for managing windows (hereinafter referred to as management data).

The original screen storage unit 409 stores data of original screens displayed on the display surfaces 101 of the display devices 207 in the normal mode. The original screens are generated by the window system 405. The original screen storage units 409a to 409g correspond to the display surfaces 101a to 101g, respectively. The display processing units 411 mainly perform processing for displaying the original screens on the display devices 207. The display processing units 411a to 411g correspond to the display surfaces 101a to 101g, respectively.

The projection mode unit 413 performs processing in the projection mode. The projection mode unit 413 has a scene storage unit 415, a perspective projection unit 417, an operation screen storage unit 419, a planar projection unit 421, a matrix storage unit 423, a calculation unit 425, an area storage unit 427 and a coordinates storage unit 429.

The scene storage unit 415 stores scene data. The scene data includes models of the display surfaces 101a to 101g and positions in the global coordinate system of the models. Further, the scene data may include models for walls, a ceiling, a floor, table or the like of the room, and positions in the global coordinate system of the models.

The perspective projection unit 417 projects the models in the room based on the scene data. Specifically, the perspective projection unit 417 generates a view seen through from a position of a virtual camera (hereinafter, referred to as a camera). The operation screen storage unit 419 stores data of an operation screen on which a perspective view is rendered. The planar projection unit 421 performs planar projection of each original screen onto an operation screen. The matrix storage unit 423 stores two homography matrices used for position conversion between the original coordinate system in the original screen and the projection coordinate system in the operation screen. The calculation unit 425 calculates two homography matrices. The homography matrix will be described later. The area storage unit 427 stores four corner positions of an area (hereinafter referred to as a display area) corresponding to a display surface in an operation screen. The four corner positions of a display area are unfixed values in the projection coordinate system and are calculated when perspective projection is performed in the perspective projection unit 417. The coordinates storage unit 429 stores the four corner positions of the display surface. The four corner positions of the display surface are fixed values in the original coordinate system. The four corner positions of the display surface coincide with the four corner positions in the model of the display surface 101 included in the scene storage unit 415.

The aforementioned display processing units 411, the projection mode unit 413, the perspective projection unit 417, the planar projection unit 421, and the calculation unit 425 are realized by using hardware resources (for example, FIG. 40) and programs for causing a processor to execute processing described below.

Figure 40:
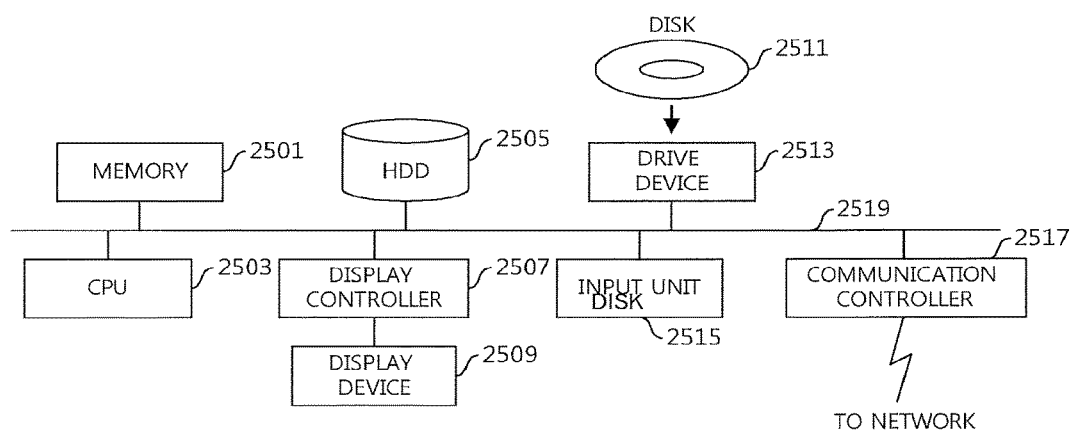
FIG. 40 is a functional block diagram of a computer.

The aforementioned management data storage unit 407, the original screen storage units 409, the scene storage unit 415, the operation screen storage unit 419, the matrix storage unit 423, the area storage unit 427 and the coordinates storage unit 429 are realized by using hardware resources (for example, FIG. 40).

Figure 5:
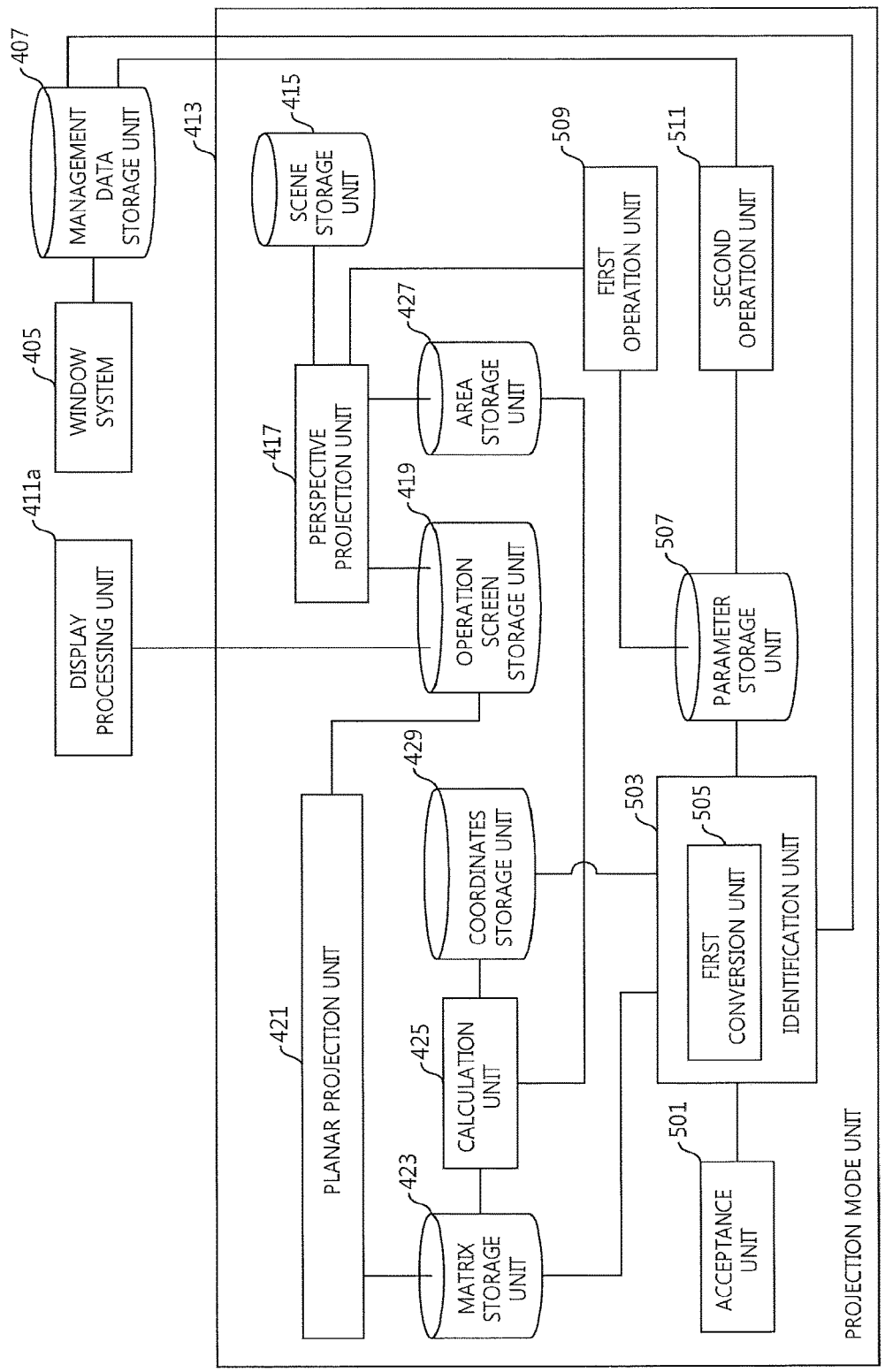
FIG. 5 is a diagram depicting an example of a module configuration of a projection mode unit.

FIG. 5 illustrates another module included in the projection mode unit 413. The projection mode unit 413 further includes an acceptance unit 501, an identification unit 503, a first conversion unit 505, a parameter storage unit 507, a first operation unit 509, and a second operation unit 511.

The acceptance unit 501 accepts plural types of instructions which are caused by events. The identification unit 503 identifies plural types of parameters based on the events. The identification unit 503 includes a first conversion unit 505. A first conversion unit 505 converts a touch position inside the display area of the operation screen to a position on the corresponding original screen.

The parameter storage unit 507 stores the plural types of parameters. The first operation unit 509 logically operates the camera in the perspective projection unit 417. The second operation unit 511 operates the window and updates the management data based on an operation result.

The aforementioned acceptance unit 501, identification unit 503, first conversion unit 505, first operation unit 509, and second operation unit 511 are realized by using hardware resources (for example, FIG. 40) and programs that causes a processor to execute processing described below.

The parameter storage unit 507 described above is realized by using hardware resources (for example, FIG. 40).

Figure 6:
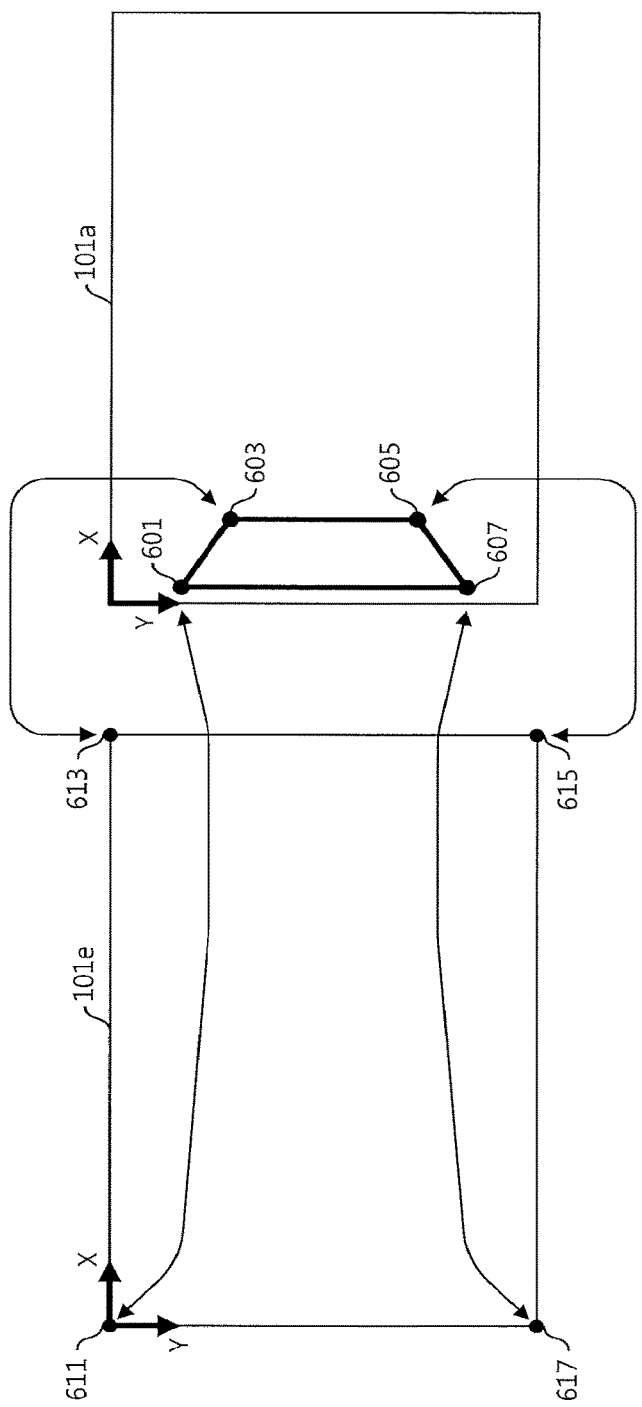
FIG. 6 is a diagram depicting a relationship between an original coordinate system and a projection coordinate system.

Here, homography matrices will be explained. FIG. 6 illustrates a relationship between the original coordinate system and the projection coordinate system. A rectangle on the left side represents the display surface 101e arranged on the left wall. A rectangle on the right side represents the display surface 101a arranged in front. On the display surface 101a, the operation screen is displayed. A trapezoid in the operation screen represents a display area corresponding to the display surface 101e.

On the display surface 101e of the member display, positions are identified according to the original coordinate system. The reference point of the original coordinate system is the upper-left end. The right direction is a positive direction of an X axis. The downward direction is a positive direction of a Y axis. Positions on the original screen are based on the original coordinate system.

On the display surface 101a of the control display, positions are identified according to the projection coordinate system. The reference point of the projection coordinate system is the upper-left end. The right direction is a positive direction of an X axis. The downward direction is a positive direction of a Y axis. Positions on the operation screen are based on the projection coordinate system.

And the upper-left end point 601 of the display area corresponds to the upper-left end point 611 of the display surface 101e. The upper-right end point 603 of the display area corresponds to the upper-right end point 613 of the display surface 101e. The lower-right end point 605 of the display area corresponds to the lower-right endpoint 615 of the display surface 101e. The lower-left end point 607 of the display area corresponds to the lower-left end point 617 of the display surface 101e. In this manner, based on a correspondence relationship between the corner positions, a first homography matrix for converting positions in the original coordinate system to corresponding positions in the projection coordinate system is calculated. In addition, a second homography matrix for converting positions in the projection coordinate system to corresponding positions in the original coordinate system is calculated. Since a method of calculating homography matrices based on the correspondence relationship of the four points is a conventional technique, it is not explained further.

Figure 7:
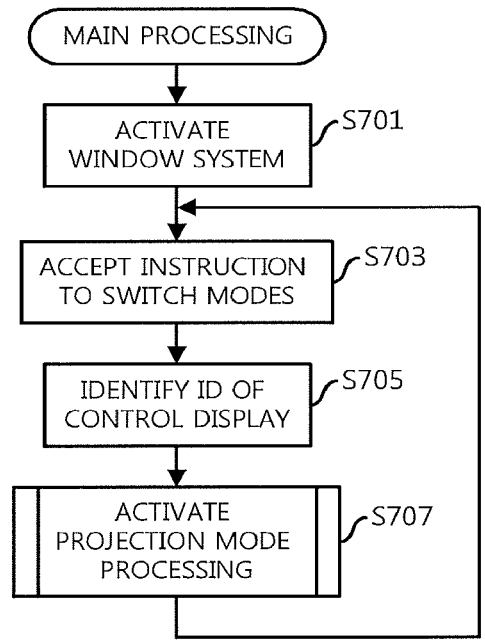
FIG. 7 is a diagram depicting an example of a main processing flow.

The following is explanations for processing. FIG. 7 illustrates an example of a main processing flow. At the start of the display control apparatus 203, the window system 405 is activated (S701). At this time, the window system 405 generates an initial original screen to be displayed on the display surface 101 of each display device 207, and stores it in each original screen storage unit 409. Then, each display processing unit 411 causes the display device 207 to display the initial original screen.

The acceptance unit 501 accepts an instruction to switch modes, which is caused by a predetermined operation (for example, a button operation or a touch operation) (S703). The acceptance unit 501 identifies the control display based on the accepted instruction (S705). In this example, it is assumed that switching mode is instructed by a touch operation on the touch panel 209a on the display surface 101a. Then, it is determined that the display device 207a providing the display surface 101a is the control display. Accordingly, the display devices 207b to 207g are the member displays.

The projection mode unit 413 activates projection mode processing (S707). Then, the projection mode unit 413 shifts to operation in the projection mode. When the projection mode is ended, the operation returns to the normal mode. In this example, the processing returns to S703 and the projection mode unit 413 waits.

Figure 8:
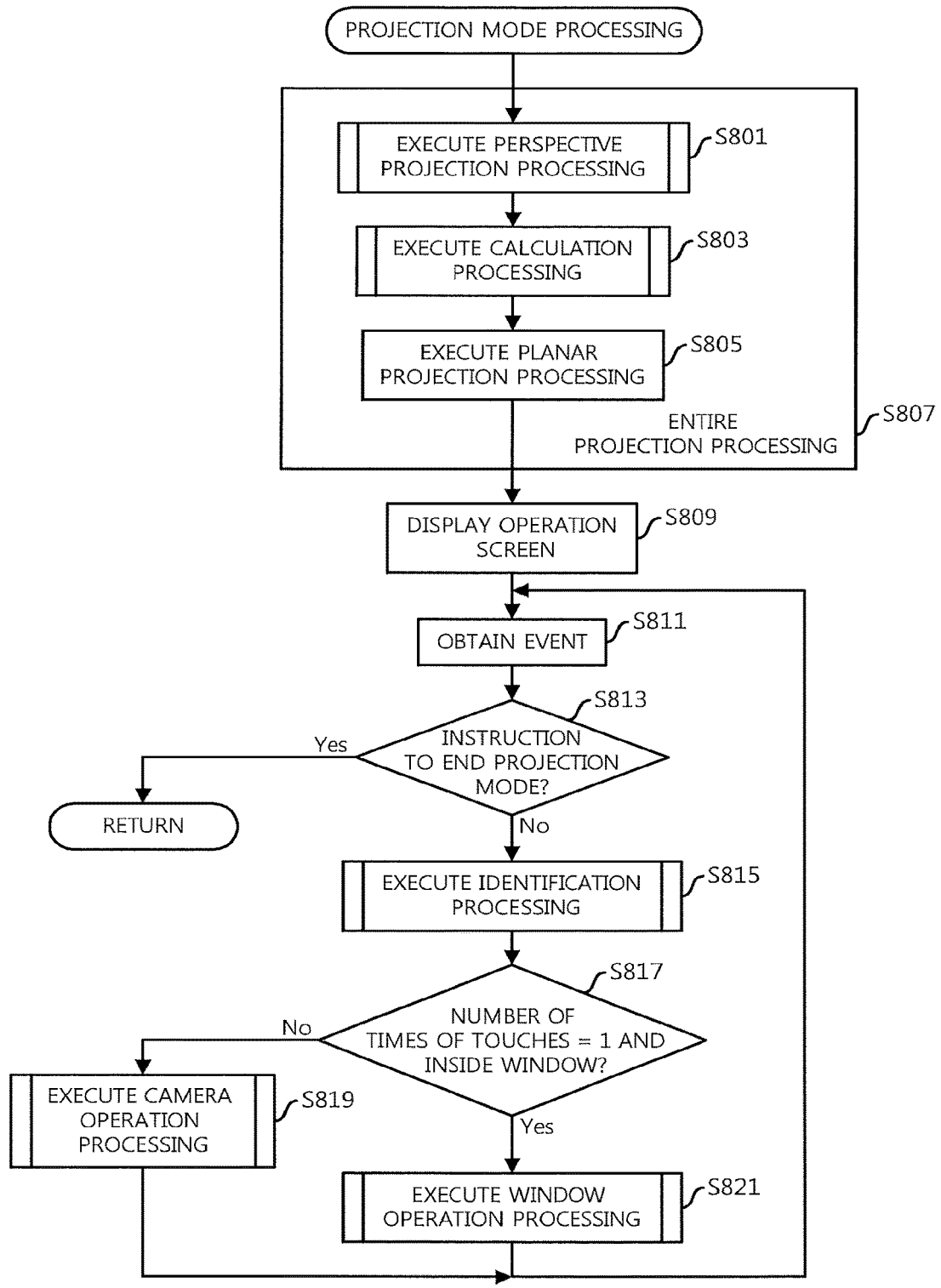
FIG. 8 is a diagram depicting an example of a flow for projection mode processing.

Next, the projection mode processing will be explained. FIG. 8 illustrates an example of a flow for the projection mode processing. First, the projection mode unit 413 generates and displays an operation screen. Therefore, the perspective projection unit 417 executes perspective projection processing (S801). In the perspective projection processing, the perspective projection unit 417 generates a perspective view based on the scene data.

Figure 9:
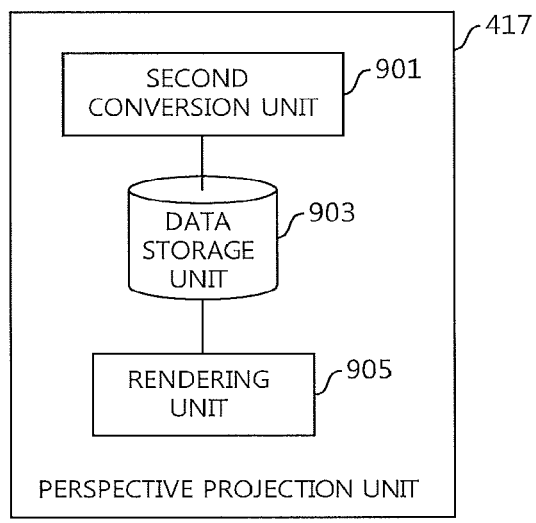
FIG. 9 is a diagram depicting an example of a module configuration of a perspective projection unit.

FIG. 9 illustrates an example of a module configuration of the perspective projection unit 417. A second conversion unit 901 converts the scene data stored in the scene storage unit 415 into data in a camera coordinate system. A data storage unit 903 stores data of the camera coordinate system. A rendering unit 905 renders a projected view based on the data of the camera coordinate system.

The second conversion unit 901 and the rendering unit 905 described above are realized by using hardware resources (for example, FIG. 40) and programs for causing the processor to execute processing described below.

The data storage unit 903 described above is realized by using hardware resources (for example, FIG. 40).

Figure 10:
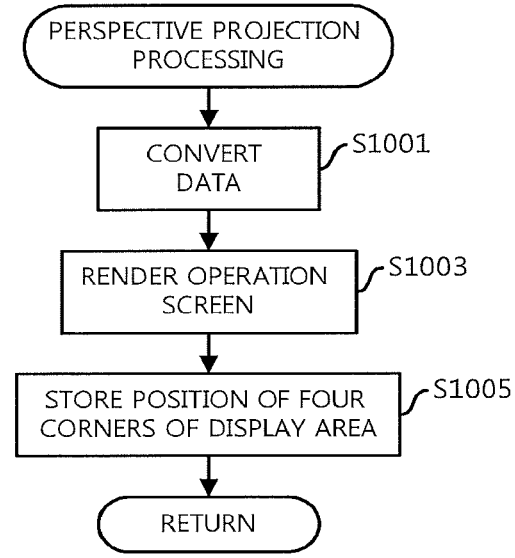
FIG. 10 is a diagram depicting an example of a flow for perspective projection processing.

FIG. 10 illustrates an example of a flow for the perspective projection processing. The second conversion unit 901 converts the scene data stored in the scene storage unit 415 into data of the camera coordinate system according to the position and attitude of the camera (S1001). The data of the camera coordinate system is stored in the data storage unit 903.

The rendering unit 905 renders a projected view based on the data of the camera coordinate system (S1003). The rendered projected view is stored in the operation screen storage unit 419 as an operation screen.

Furthermore, the rendering unit 905 stores four corner positions of each display area in the projected view in the area storage unit 427 (S1005). The four corner positions of the display area are in the projection coordinate system.

When completing the perspective projection processing, the processing shifts to S803 in FIG. 8.

Returning to the explanation of FIG. 8, the calculation unit 425 executes calculation processing (S803). In the calculation processing, the calculation unit 425 calculates the first homography matrix and the second homography matrix.

Figure 11:
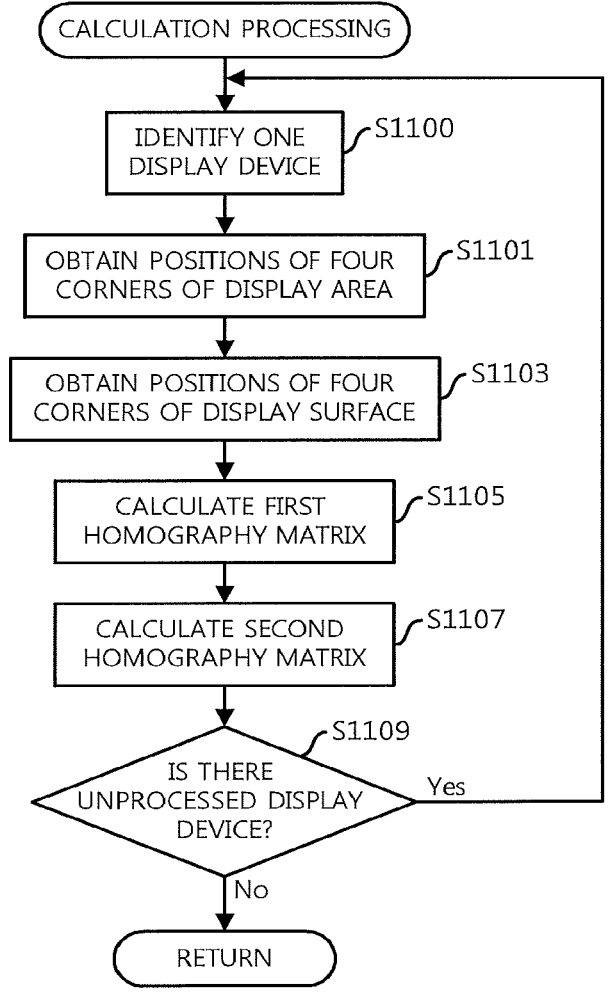
FIG. 11 is a diagram depicting an example of a flow for calculation processing.

FIG. 11 illustrates an example of a flow for the calculation processing. The calculation unit 425 identifies one display device 207 (S1100). The calculation unit 425 obtains, from the area storage unit 427, four corner positions (the projection coordinate system) of the display area corresponding to the identified display device 207 (S1101). The calculation unit 425 obtains, from the coordinates storage unit 429, four corner positions (the original coordinate system) of the display surface 101 corresponding to the identified display device 207 (S1103).

Then, as explained above with reference to FIG. 6, the calculation unit 425 calculates, based on correspondence relationship of the four corner positions, a first homography matrix for converting positions in the original coordinate system to corresponding positions in the projection coordinate system (S1105). The calculation unit 425 calculates a second homography matrix for converting positions of the projection coordinate system to corresponding positions in the original coordinate system (S1107). The second homography matrix is an inverse matrix of the first homography matrix. The calculation unit 425 determines whether or not there is an unprocessed display device 207 (S1109). When it is determined that there is an unprocessed display device 207, the processing returns to S1100 and the aforementioned processing is repeated. On the other hand, when it is determined that there is no unprocessed display device 207, the processing shifts to S805 in FIG. 8. As for the control display, the aforementioned calculation may be omitted.

Returning to the explanation of FIG. 8, the planar projection unit 421 executes planar projection processing (S805). The planar projection unit 421 projects an original screen onto a display area of the operation screen by the first homography matrix. In other words, the planar projection unit 421 shifts pixel values of the original screen to predetermined positions on the operation screen. Then, the planar projection unit 421 performs interpolation processing of image data in the display area. The interpolation processing is data processing for making the converted image easier to see. The planar projection unit 421 performs the aforementioned processing on the original screen of each member display.

By the processing illustrated in S801 to S805, an operation screen is generated. Hereinafter, processing equivalent to the processing of S801 to S805 may be referred to as entire projection processing (S807).

The display processing unit 411 corresponding to the control display causes the display device 207 of the control display to display the generated operation screen (S809). In this example, the display processing unit 411a causes the display device 207a to display the operation screen.

At this stage, the acceptance unit 501 obtains an event (S811). The acceptance unit 501 determines whether or not the obtained event is an instruction to end the projection mode (S813). When it is determined that the obtained event is an instruction to end the projection mode, the projection mode processing ends and the processing returns to S703 illustrated in FIG. 7.

On the other hand, when it is determined that the obtained event is not an instruction to end the projection mode, the identification unit 503 executes identification processing (S815). In this example, it is assumed that the event obtained in S811 is a touch operation. Then, in the identification processing, the identification unit 503 identifies plural types of parameters based on the touch operation.

Figure 12:
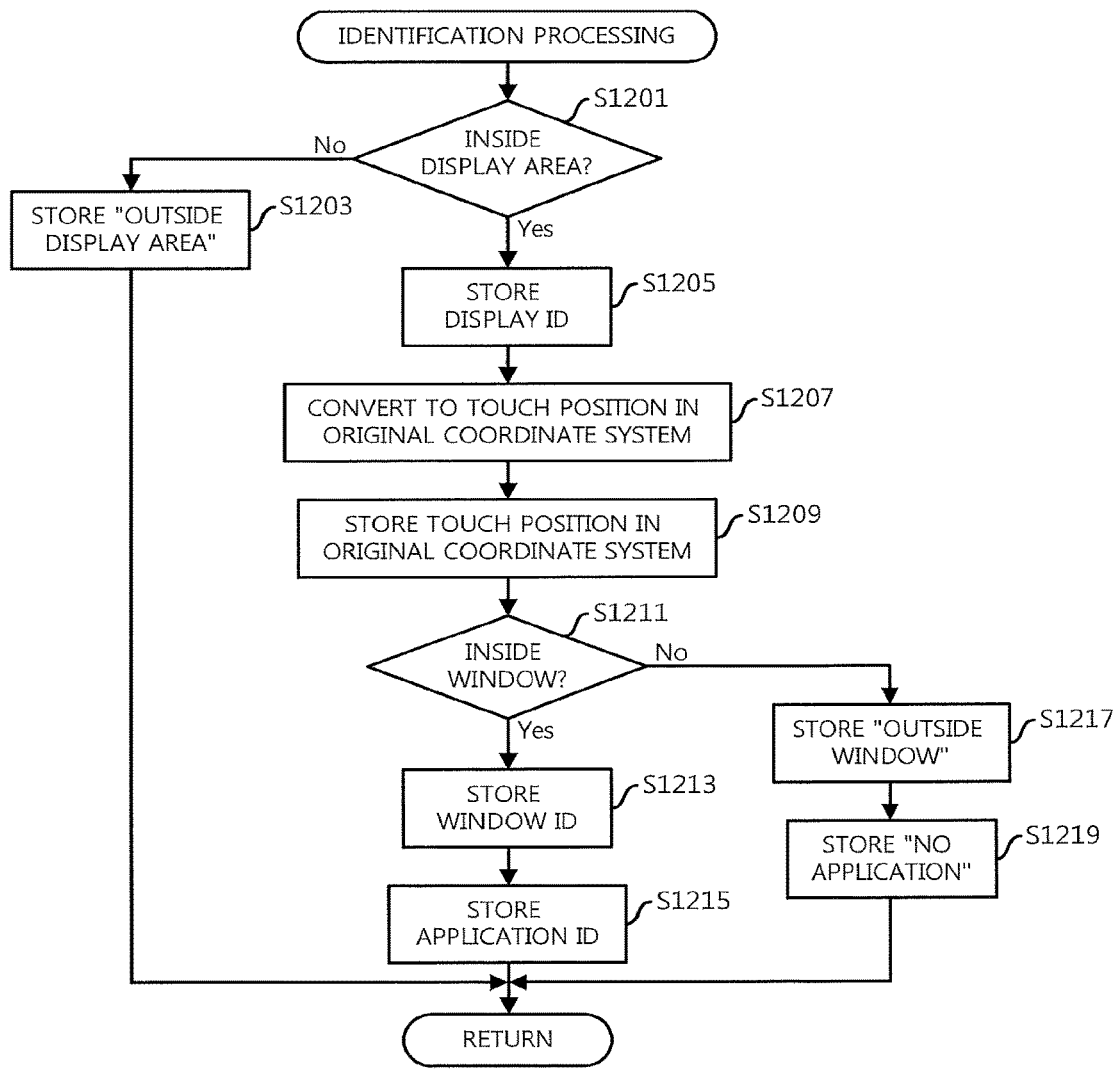
FIG. 12 is a diagram depicting an example of a flow for identification processing.

FIG. 12 illustrates an example of a flow of the identification processing. In the identification processing, a touch position in the original coordinate system, which corresponds to a touch position in the projection coordinate system, a display ID which corresponds to a display area including a touch position, an ID of a window including a touch position and an ID of an application program 401 corresponding to the window are identified.

The identification unit 503 determines, based on the data stored in the area storage unit 427, whether or not the touch position in the projection coordinate system is inside the display area (S1201). When it is determined that the touch position in the projection coordinate system is not inside the display area, the identification unit 503 stores information representing "outside display area" in the parameter storage unit 507 (S1203). "Outside display area" means, for example, a touch to a position corresponding to a wall surface. Then, the identification processing is completed.

When it is determined that the touch position in the projection coordinate system is inside the display area, the identification unit 503 stores a display ID corresponding to the display area in the parameter storage unit 507 (S1205). The first conversion unit 505 converts the touch position in the projection coordinate system to a touch position in the original coordinate system according to the second homography matrix (S1207). Then, the identification unit 503 stores the touch position in the original coordinate system in the parameter storage unit 507 (S1209).

Furthermore, the identification unit 503 determines whether or not the touch position of the original coordinate system is inside one of windows 103 based on the management data (S1211). When it is determined that the touch position in the original coordinate system is inside one of the windows 103, the identification unit 503 stores an ID of the window 103 in the parameter storage unit 507 (S1213). Further, the identification unit 503 identifies an application ID corresponding to the window ID based on the management data and stores it in the parameter storage unit 507 (S1215). Then, the identification processing ends.

On the other hand, when it is determined that the touch position in the original coordinate system is not inside one of the windows 103, the identification unit 503 stores information representing "outside window" in the parameter storage unit 507 (S1217). Furthermore, the identification unit 503 stores information representing "no application" in the parameter storage unit 507 (S1219). Then, the identification processing ends. Upon completion of the identification processing, the processing shifts to S817 of FIG. 8.

Returning to the explanation of FIG. 8, the acceptance unit 501 determines, based on a result of the identification processing, whether or not the event obtained in S811 is a touch inside the window and the number of times of touches=1 (S817). When the event is a touch inside the window and the number of times of touches=1, it is a touch operation such as a tap operation or a drag operation for the window. Therefore, the second operation unit 511 executes window operation processing (S821). On the other hand, when the event is a touch outside the window and the number of times of touches=2, it is a camera operation such as rotation and movement of the camera. Therefore, the first operation unit 509 executes camera operation processing (S819). Upon completion of the window operation processing or the camera operation processing, the processing returns to S811 and the aforementioned processing is repeated.

Figure 13:
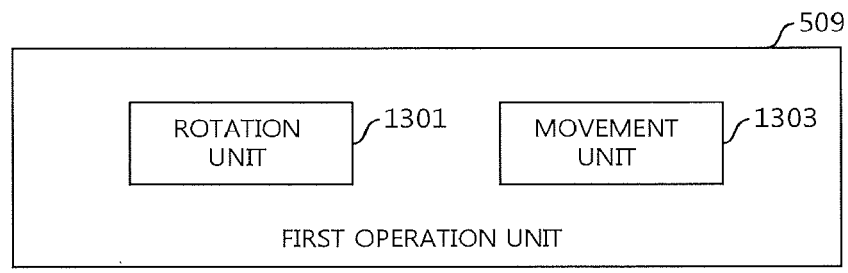
FIG. 13 is a diagram depicting an example of a module configuration of a first operation unit.

In the following, the camera operation processing and the window operation processing will be explained in detail in this order. FIG. 13 illustrates an example of a module configuration of a first operation unit 509 that performs camera operation processing. The first operation unit 509 has a rotation unit 1301 and a movement unit 1303. The rotation unit 1301 performs a rotation operation of the camera. A movement unit 1303 performs a movement operation of the camera. Here, Movement means back-and-forth movement.

The rotation unit 1301 and the movement unit 1303 described above are realized by using hardware resources (for example, FIG. 40) and programs for causing the processor to execute the processing described below.

Figure 14:
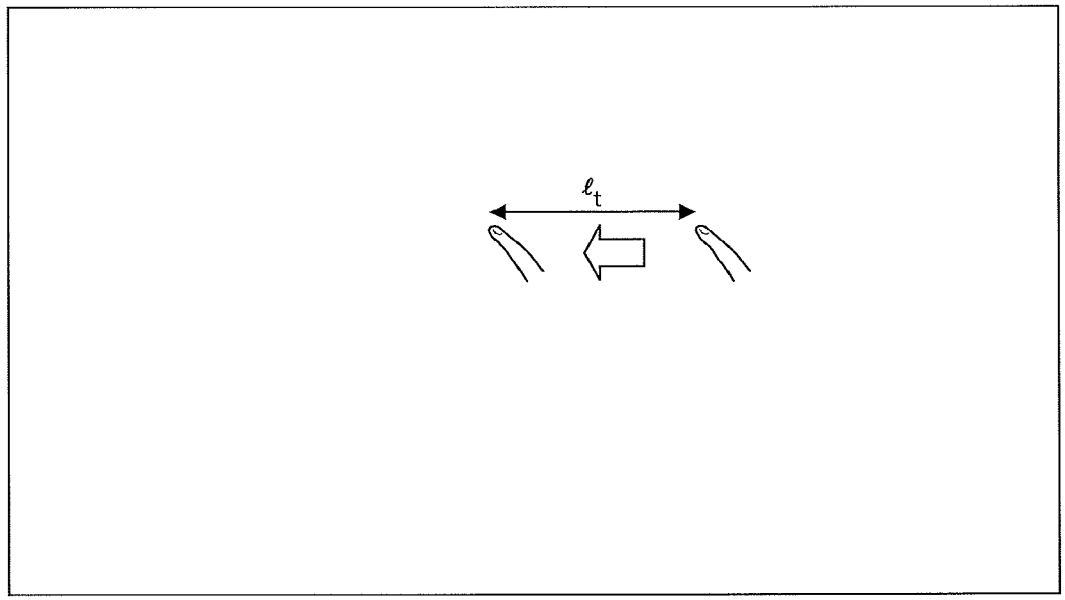
FIG. 14 is a diagram depicting an example of touches to instruct rotation of a camera.

FIG. 14 illustrates an example of a touch to instruct camera rotation. In this example, firstly the user touches an outside of the window 103 of the operation screen and slides the touch position to rotate the camera. It is to be noted that $l_t$ represents a distance of sliding in the left direction. When the touch position is slid in the lateral direction, the camera rotates in the horizontal direction.

Figure 15:
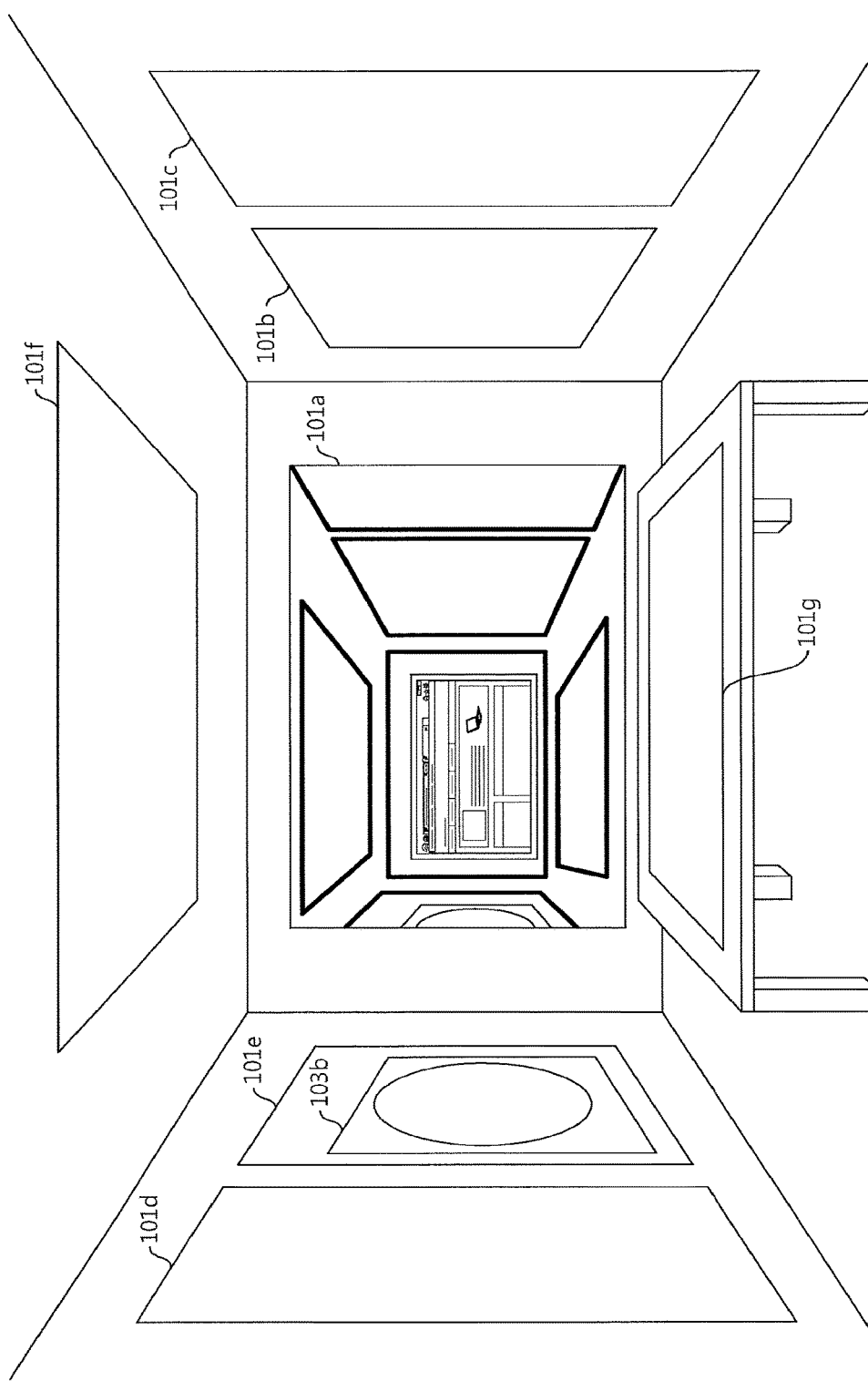
FIG. 15 is a diagram depicting an example of display of the operation screen after the rotation of camera.

FIG. 15 illustrates an example of display of the operation screen after rotation of the camera. The projected view on the operation screen of the display surface 101a is rendered based on a state in which the camera is rotated in the horizontal direction.

Figure 16:
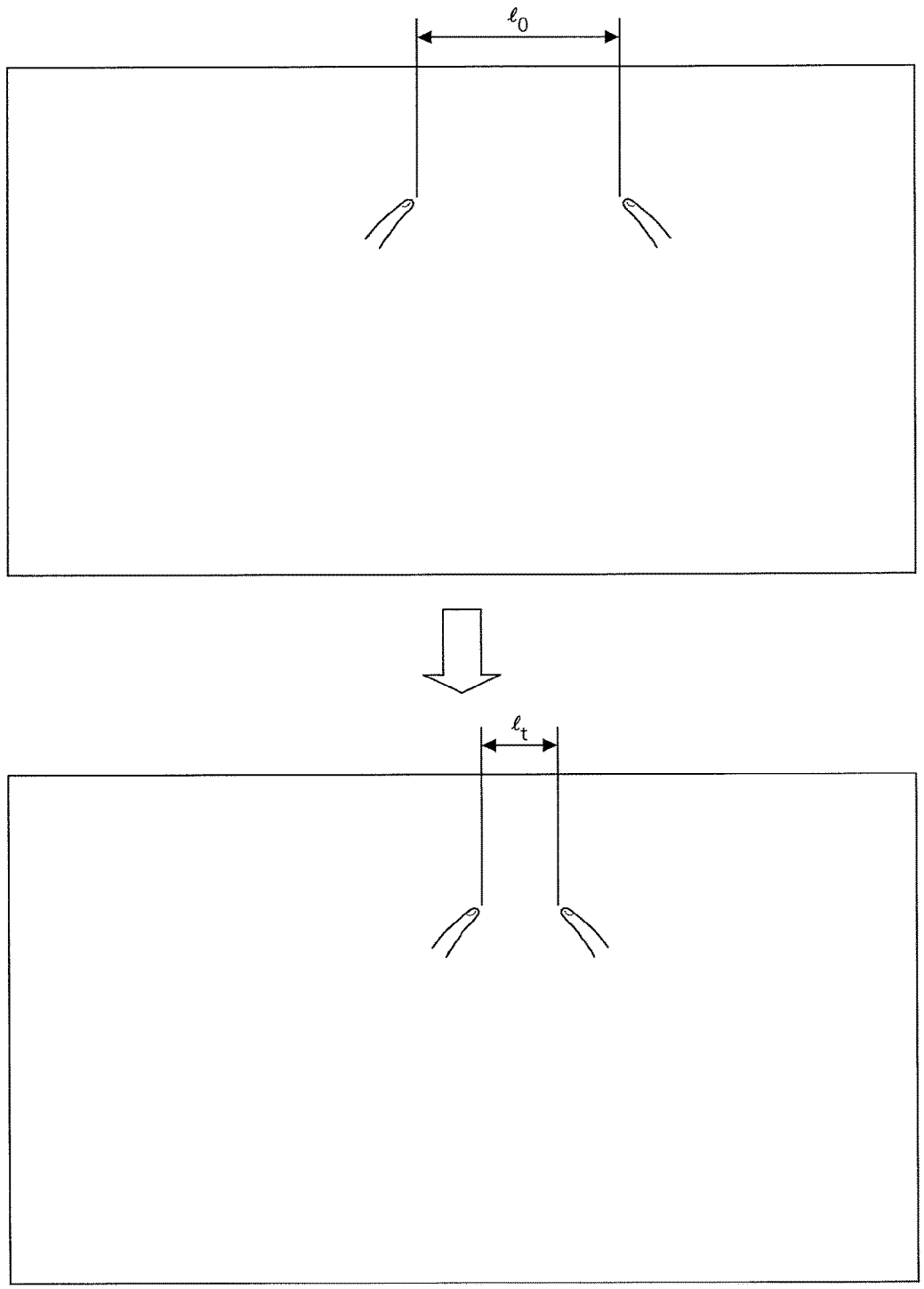
FIG. 16 is a diagram depicting an example of touches to instruct movement of the camera.

FIG. 16 illustrates an example of a touch to instruct camera movement. In this example, firstly two points are touched on the operation screen, and by changing the distance, the camera is moved back and forth. In addition, $l_0$ represents a distance between the first two points. $l_t$ represents a distance between two points after the change. When the distance is shortened, the camera moves backward.

Figure 17:
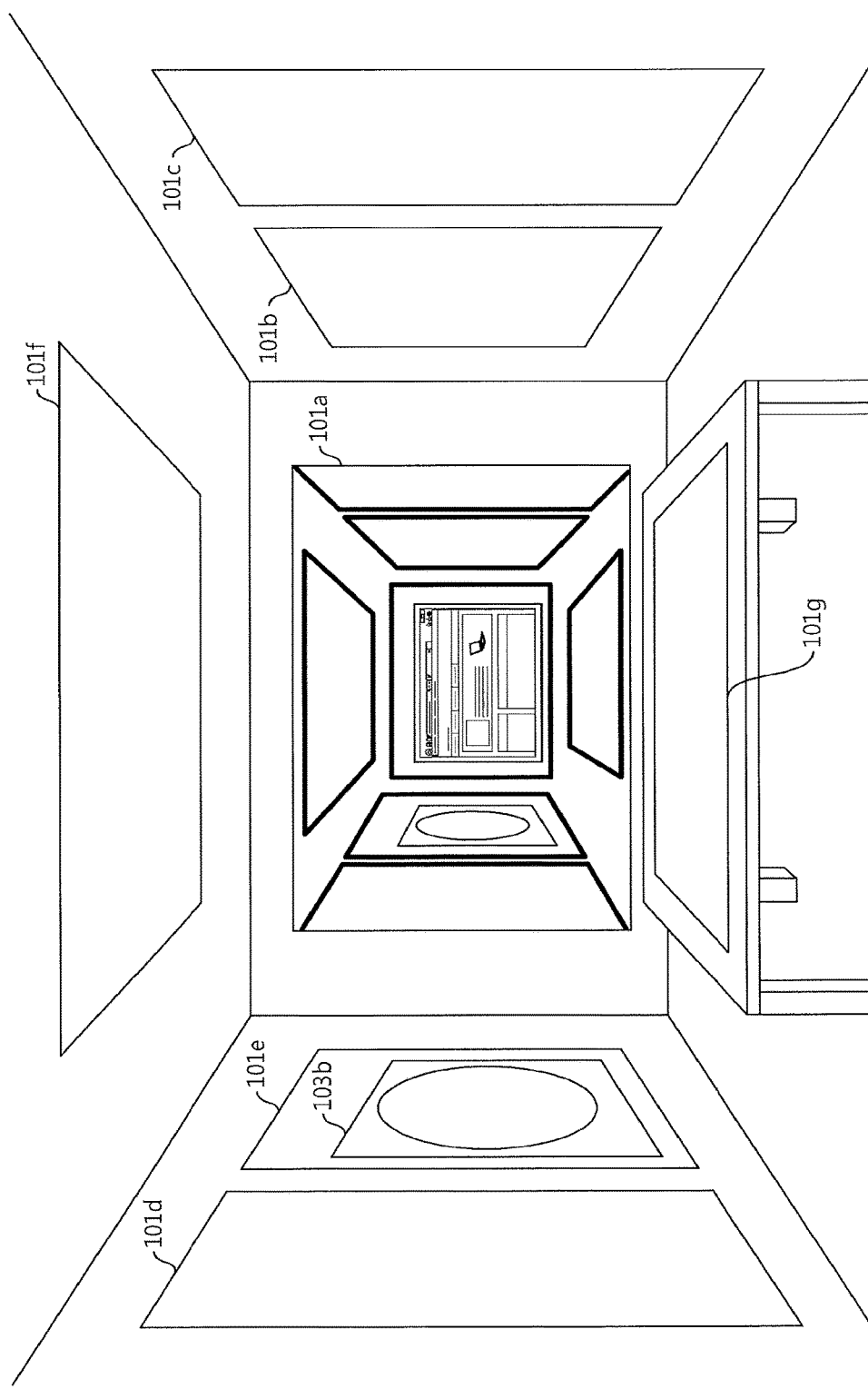
FIG. 17 is a diagram depicting an example of display of the operation screen after the movement of camera.

FIG. 17 illustrates an example of display of the operation screen after camera movement. The projected view on the operation screen of the display surface 101a is rendered based on a state in which the camera was moved backward.

Figure 18:
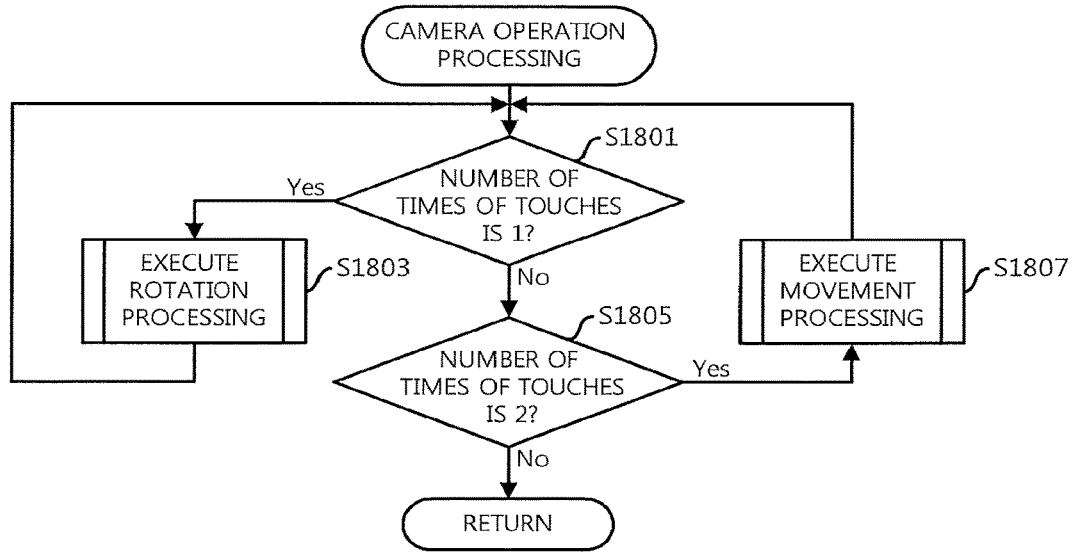
FIG. 18 is a diagram depicting an example of a flow for camera operation processing.

FIG. 18 illustrates an example of a flow of the camera operation processing. The acceptance unit 501 determines whether or not the number of times of touches represented by the event obtained in S811 of FIG. 8 is 1 (S1801). When it is determined that the number of times of touches is 1, since it is a slide operation, the rotation unit 1301 executes rotation processing (S1803).

On the other hand, when it is determined that the number of times of touches is not 1, the acceptance unit 501 determines whether or not the number of times of touches is 2 (S1805). When it is determined that the number of times of touches is 2, since it is a pinch operation, the movement unit 1303 executes movement processing (S1807). When it is determined that the number of times of touches is not 2, it is regarded as an end instruction and the camera operation is completed.

Figure 19:
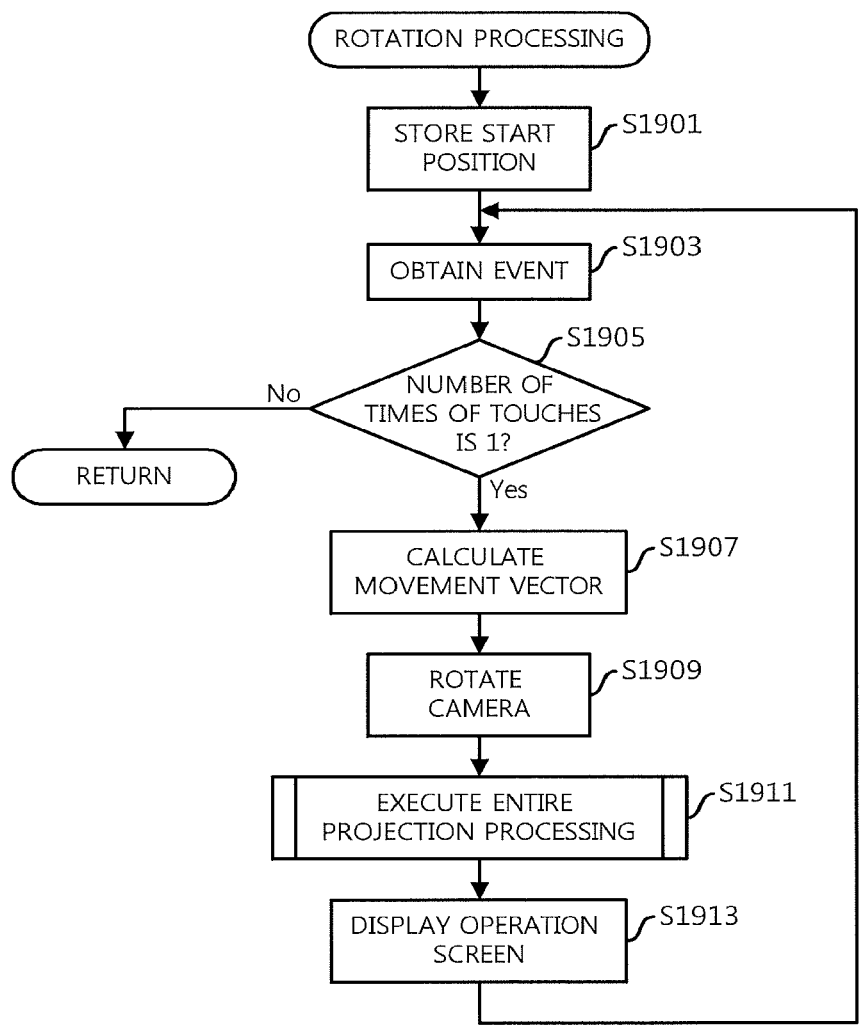
FIG. 19 is a diagram depicting an example of a flow for rotation processing.

Next, the rotation processing will be explained. FIG. 19 illustrates an example of a flow for the rotation processing. The rotation unit 1301 stores, in the parameter storage unit 507, the touch position represented by the event obtained in S811 of FIG. 8 as a position of a start point (S1901). The acceptance unit 501 obtains an event (S1903). The acceptance unit 501 determines whether or not the number of times of touches, which is represented by the obtained event, is 1 (S1905). When it is determined that the number of times of touches, which is represented by the obtained event, is not 1, it is regarded as an end instruction and the rotation processing is completed.

On the other hand, when it is determined that the number of times of touches, which is represented by the obtained event, is 1, the rotation unit 1301 calculates a movement vector by using the touch position represented by the event obtained in S1903 as a position of an end point (S1907).

The rotation unit 1301 rotates the camera based on the movement vector (S1909). As illustrated in FIG. 14, regarding the lateral direction component, a pitch angle p is changed according to the following expression, for example.

$$p_t = p_{t-1} + (l_t/d_t)C_1$$

$p_t$ is a current pitch angle. $p_{t-1}$ is the previous pitch angle. $d_t$ is a distance between the camera and the display surface 101 of the control display. $C_1$ is a constant.

Figure 20:
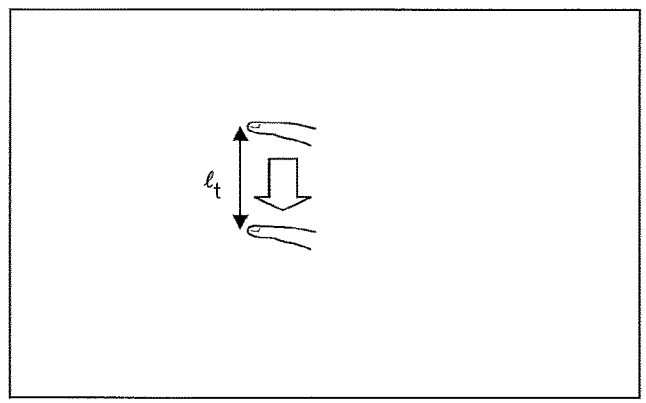
FIG. 20 is a diagram depicting an example of touches to instruct rotation of the camera.

FIG. 20 illustrates an example where the touch position is slid in the vertical direction. It is to be noted that $l_t$ represents a distance of sliding in the downward direction. When the touch position is slid in the longitudinal direction, the camera rotates in the vertical direction. For the vertical direction component, a yaw angle y is changed according to the following expression, for example.

$$y_t = y_{t-1} + (l_t/d_t)C_2$$

$y_L$ is a current yaw angle. $y_{L-1}$ is the previous yaw angle. $C_2$ is a constant.

Returning to the explanation of FIG. 8, the projection mode unit 413 executes the entire projection processing in the same manner as the processing in S807 illustrated in FIG. 8 (S1911). The display processing unit 411 corresponding to the control display causes the display device 207 to display the operation screen in the same manner as the processing in S809 illustrated in FIG. 8 (S1913). Then, the processing returns to the processing of S1903 and the above-described processing is repeated.

Figure 21:
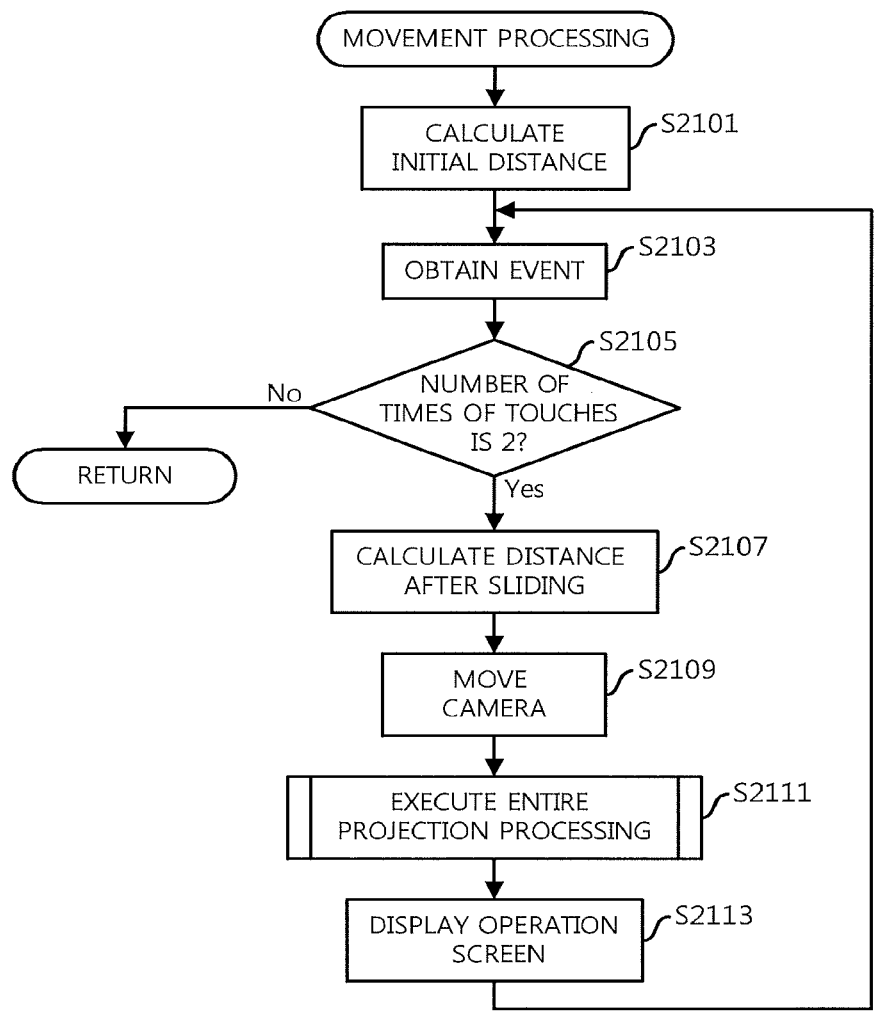
FIG. 21 is a diagram depicting an example of a flow for movement processing.

Next, the movement processing will be explained. FIG. 21 illustrates an example of a processing for the movement processing. The movement unit 1303 calculates a distance between two touch positions represented by the event obtained in S811 of FIG. 8, and stores it in the parameter storage unit 507 as an initial distance (S2101). The acceptance unit 501 obtains the event (S2103). The acceptance unit 501 determines whether or not the number of times of touches, which is represented by the obtained event, is 2 (S2105). When it is determined that the number of times of touches, which is represented by the obtained event, is not 2, it is regarded as an end instruction and the movement processing is completed.

On the other hand, when it is determined that the number of times of touches, which is represented by the obtained event, is 2, the movement unit 1303 calculates a distance between two touch positions, which is represented by the event obtained in S2103, as a distance after sliding (S2107). The movement unit 1303 logically moves the camera back and forth, based on the initial distance and the distance after sliding (S2109).

Figure 22:
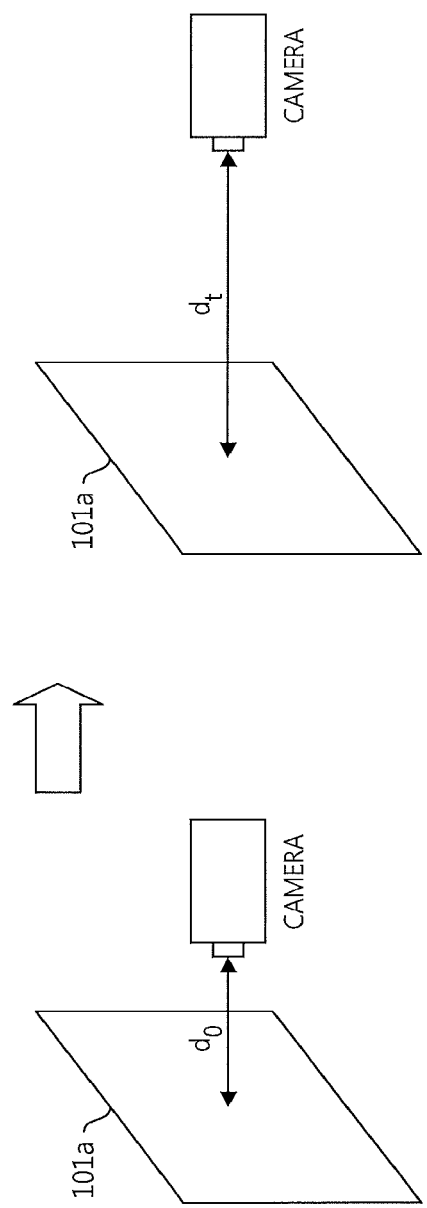
FIG. 22 is a diagram depicting an example of movement of the camera.

FIG. 22 illustrates how the camera moves. This example illustrates how the camera moves backward when the distance is shortened. Both $d_0$ and $d_t$ represent a distance between the camera and the display surface 101a in the global coordinate system. $d_0$ represents the distance before the camera moves. $d_L$ represents the distance after the camera moved. For example, according to the following formula, the distance d between the camera and the display surface 101a is changed.

$d_t = d_{t-1} + (1 - l_t/l_0)C_3$

As described in FIG. 16, $l_0$ represents the initial distance. $l_t$ represents the distance after sliding. $C_3$ is a constant.

Returning to the explanation of FIG. 21, the projection mode unit 413 executes the entire projection processing as described above (S2111). The display processing unit 411 corresponding to the control display causes the display device 207 to display the operation screen as described above (S2113). Then, returning to the processing of S2103, the aforementioned processing is repeated.

The explanation of the camera operation ends. Window operation processing will be explained from here.

Figure 23:
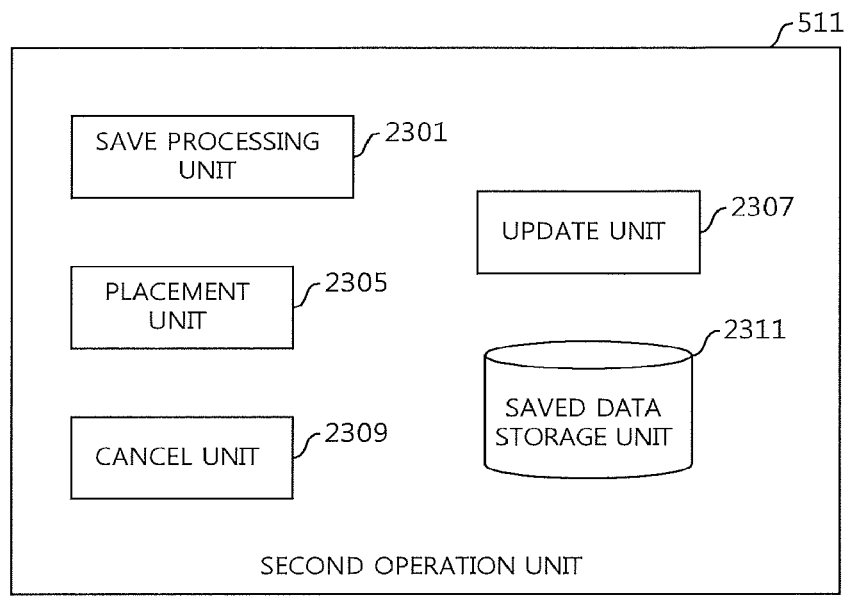
FIG. 23 is a diagram depicting an example of a module configuration of a second operation unit.

FIG. 23 illustrates an example of a module configuration of the second operation unit 511 that performs the window operation processing. The second operation unit 511 has a save processing unit 2301, a placement unit 2305, an update unit 2307, a cancel unit 2309, and a saved data storage unit 2311.

The save processing unit 2301 mainly saves management data. The placement unit 2305 arranges icons. The update unit 2307 updates the management data. The cancel unit 2309 cancels a window operation. The saved data storage unit 2311 stores the management data to be saved.

The aforementioned save processing unit 2301, placement unit 2305, update unit 2307, and cancel unit 2309 are realized by using hardware resources (for example, FIG. 40) and programs for causing the processor to execute the processing described below.

The aforementioned saved data storage unit 2311 is realized by using hardware resources (for example, FIG. 40).

Figure 24:
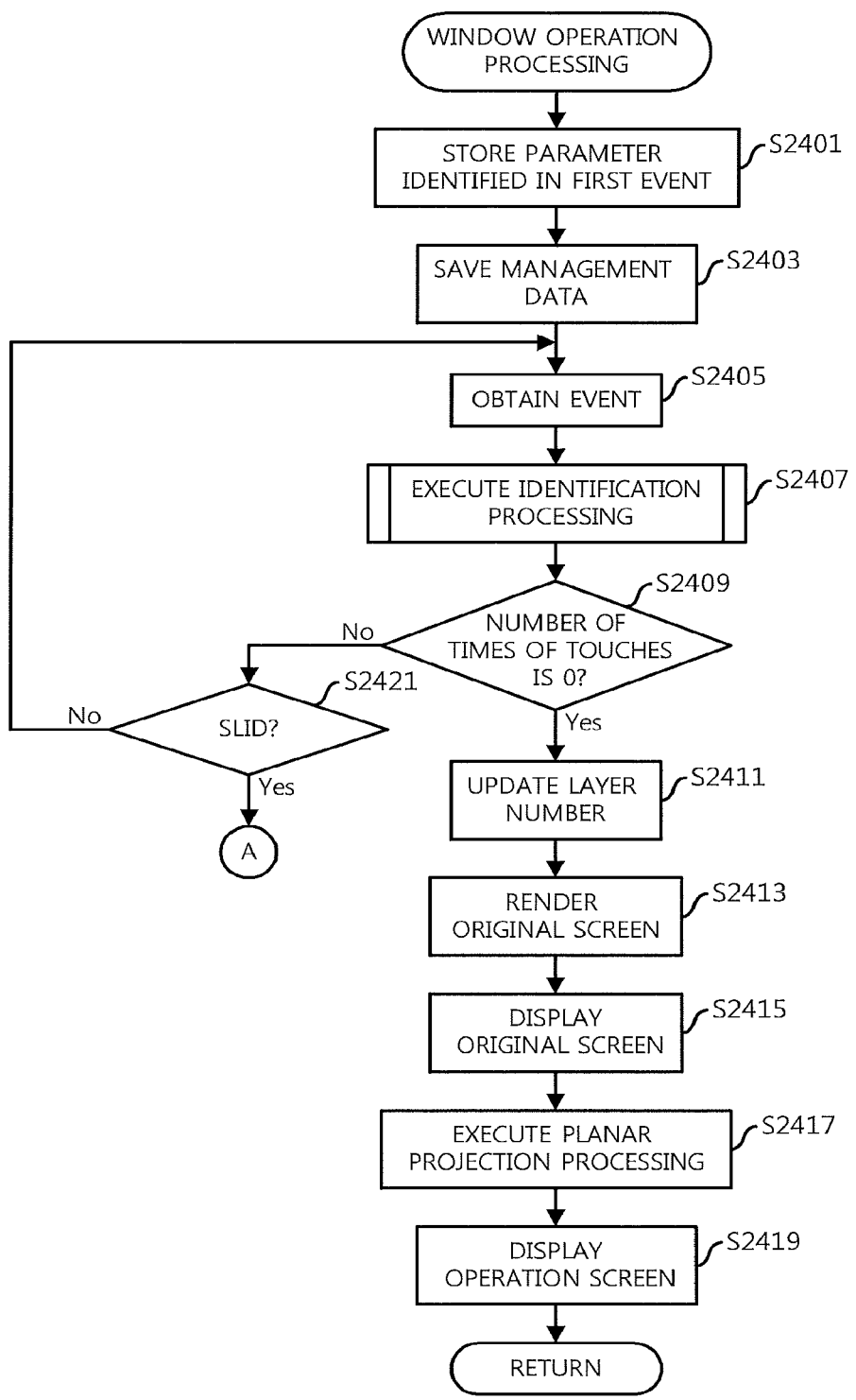
FIG. 24 is a diagram depicting an example of a flow for window operation processing.

FIG. 24 illustrates an example of a flow for the window operation processing. The save processing unit 2301 stores parameters identified, based on the event obtained first in S811 of FIG. 8 and in S815, in the saved data storage unit 2311 (S2401). The save processing unit 2301 further saves the management data stored in the management data storage unit 407 to the saved data storage unit 2311 (S2403). The saved management data is used, for example, in canceling a window operation.

The acceptance unit 501 obtains an event (S2405). The identification unit 503 executes the identification processing as described above (S2407). The acceptance unit 501 determines whether or not the number of times of touches, which is represented by the event obtained in S2405, is 0 (S2409).

When it is determined that the number of times of touches, which is represented by the event obtained in S2405, is 0, it is a tap operation or a long press operation. In this embodiment, when the tap operation or the long press operation is performed in the window, the display layer is changed.

Figure 25:
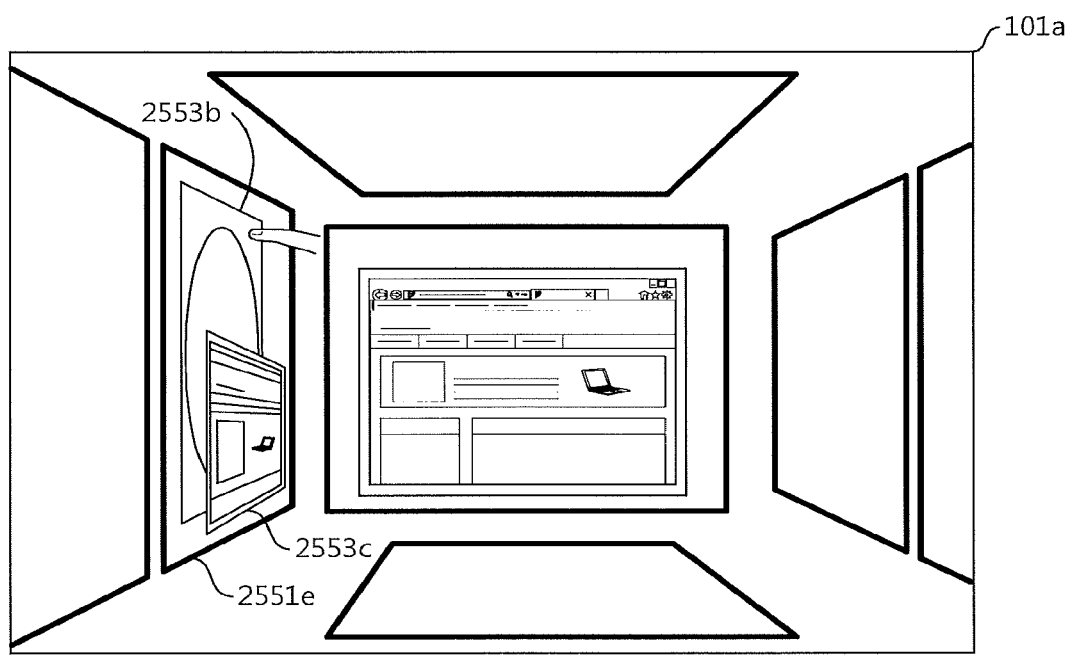
FIG. 25 is a diagram depicting an example of a tap operation.

FIG. 25 illustrates an example of a tap operation. In the display region 2551e, a window 2553b and a window 2553c for which planar projection was performed are rendered. The window 2553c is displayed in front of the window 2553b. In this state, when the user taps the window 2553b, the window 2553b moves to the front.

Figure 26:
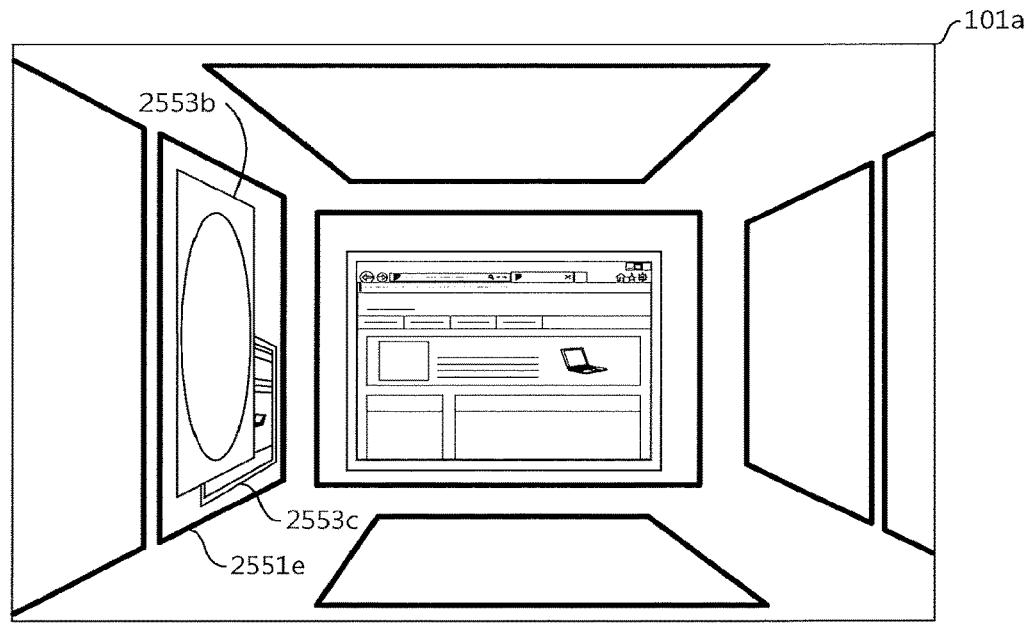
FIG. 26 is a diagram depicting an example of display of the operation screen after layer change.

FIG. 26 illustrates an example of display of the operation screen after layer change. The window 2553b is displayed in front of the window 2553c. At this time, also on the original screen of the display surface 101e corresponding to the display region 2551e, the window 103b on the background similarly moves to the front. In other words, the movement in the display area 2551e of the operation screen is synchronized with the movement in the original screen of the display surface 101e.

Returning to the explanation of FIG. 24, based on the display ID and the window ID stored in S2401, the update unit 2307 identifies a record in the management data and updates a layer number in the record to the value "1" corresponding to the foreground (S2411). At this time, layer numbers in other records having the same display ID are also lowered while maintaining a magnitude relationship.

Figure 27:
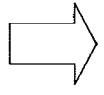
FIG. 27 is a diagram depicting an example of update of management data.

FIG. 27 illustrates an example of update of the management data. The management data in this example is in a table format. However, the management data may be in a format other than the table format. The management data in this example has records corresponding to windows. The record of the management data includes a field for setting a display ID, a field for setting an application ID, a field for setting a window ID, a field for setting a window position, a field for setting a window size, and a field for setting a layer number.

A display device 207 that displays the original screen including the window is identified by a display ID. In this example, the display ID "DSP-A" points to the display device 207a. Similarly, the display ID "DSP-E" points to the display device 207e.

An application program 401 that provides a screen to the window is specified by an application ID. In this example, the application ID "APL-1" points to the application program 401a. Similarly, the application ID "APL-2" points to the application program 401b. Similarly, the application ID "APL-3" points to the application program 401c (not illustrated).

A window ID is used to identify the window 103. In this example, the window ID "WIN-1" points to the original window 103a corresponding to the projected window 2553a (not illustrated). Similarly, the window ID "WIN-2" points to the original window 103b corresponding to the projected window 2553b. Similarly, the window ID "WIN-3" points to the original window 103c (not illustrated) corresponding to the projected window 2553c.

The window position is the position of the window 103 in the original coordinate system. The window size is the size of the window 103 in the original coordinate system. The layer number is a number assigned to a display layer to which the window belongs. The display layer with the smaller number is displayed in front.

The upper part of FIG. 27 illustrates the management data in a state (before tapping) illustrated in FIG. 25. At this point, a layer number of the original window 103c corresponding to the projected window 2553c is "1", and a layer number of the original window 103b corresponding to the projected window 2553b is "2". Therefore, as illustrated in FIG. 25, the projected window 2553b is hidden behind the projected window 2553c.

The lower part of FIG. 27 illustrates the management data in a state (after tapping) illustrated in FIG. 26. At this time, a layer number of the original window 103c corresponding to the projected window 2553c is "2", and a layer number of the original window 103b corresponding to the projected window 2553b is "1". Therefore, as illustrated in FIG. 26, the projected window 2553b appears before the projected window 2553c.

Returning to the explanation of FIG. 24, the window system 405 renders the original screen corresponding to the display ID stored in S2401 and stores it in the original screen storage unit 409 (S2413). The display processing unit 411 corresponding to the display ID displays the rendered original screen on the display device 207 identified by the display ID (S2415). The planar projection unit 421 executes the planar projection processing on the rendered original screen (S2417). The display processing unit 411 corresponding to the control display causes the display device 207 to display the operation screen (S2419). Then, the window operation processing is completed. The procedure for layer change is completed.

Returning to the explanation of the processing of S2409 illustrated in FIG. 24, in S2409, when it is determined that the numbers of times of touches, which is represented by the event obtained in S2405, is not 0, in other words, when the number of times of touches is 1, the acceptance unit 501 determines whether or not the touch position has slid (S2421). When the number of times of touches is two or more, the window operation processing may be completed.

When it is determined that the touch position has not slid, it is in a state for a long press operation, since the processing returns to S2405 and the aforementioned processing is repeated.

Figure 28:
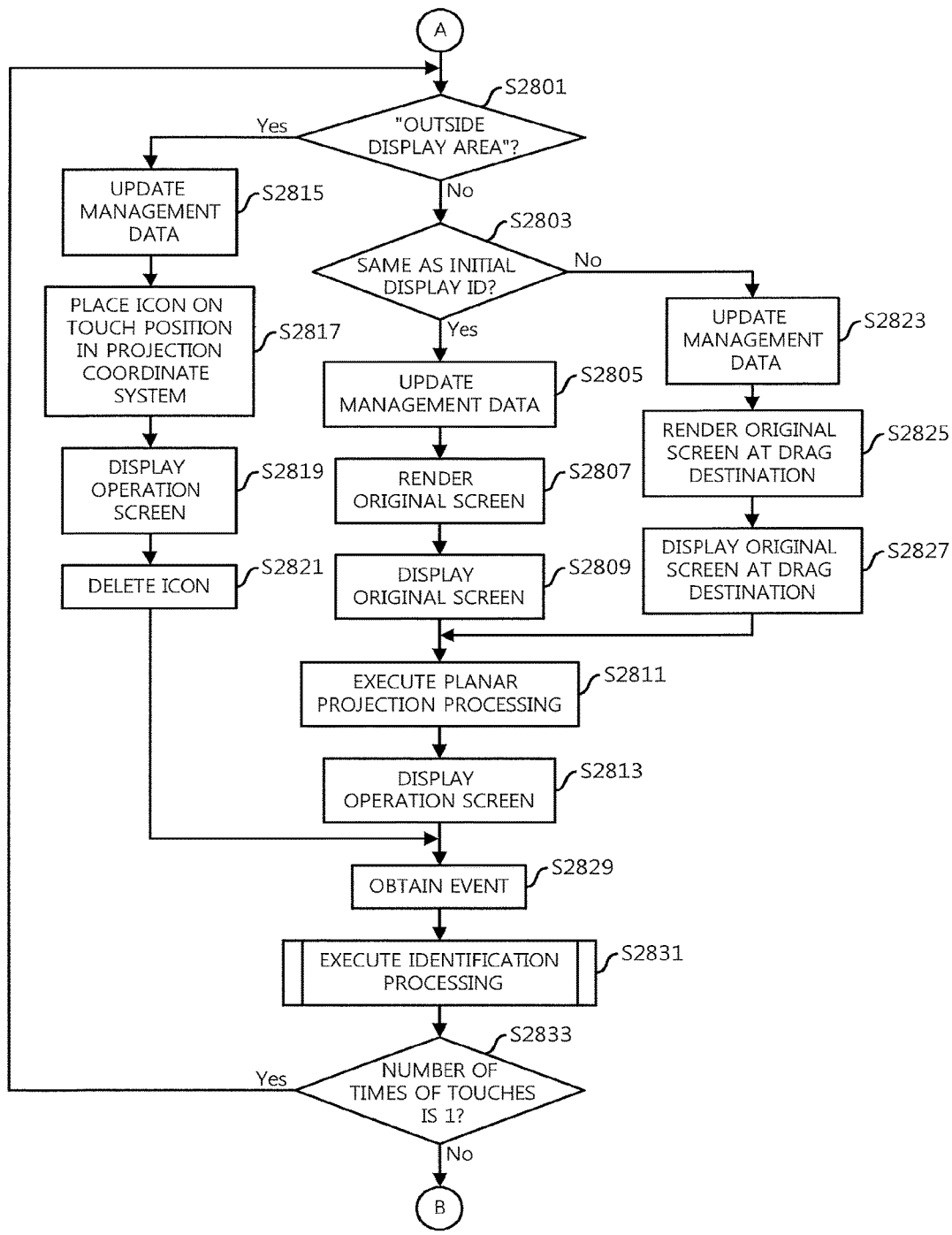
FIG. 28 is a diagram depicting an example of a flow for the window operation processing.

On the other hand, when it is determined that the touch position has slid, the processing shifts to S2801 illustrated in FIG. 28 via the terminal A.

Shifting to the explanation of FIG. 28, the procedure of a drag operation is realized in the following. The update unit 2307 determines whether or not a result of the immediately preceding identification processing is "outside display area" (S2801). At the beginning of the drag operation, since the touch position remains inside the display area, it is determined not to be "outside display area".

Figure 29:
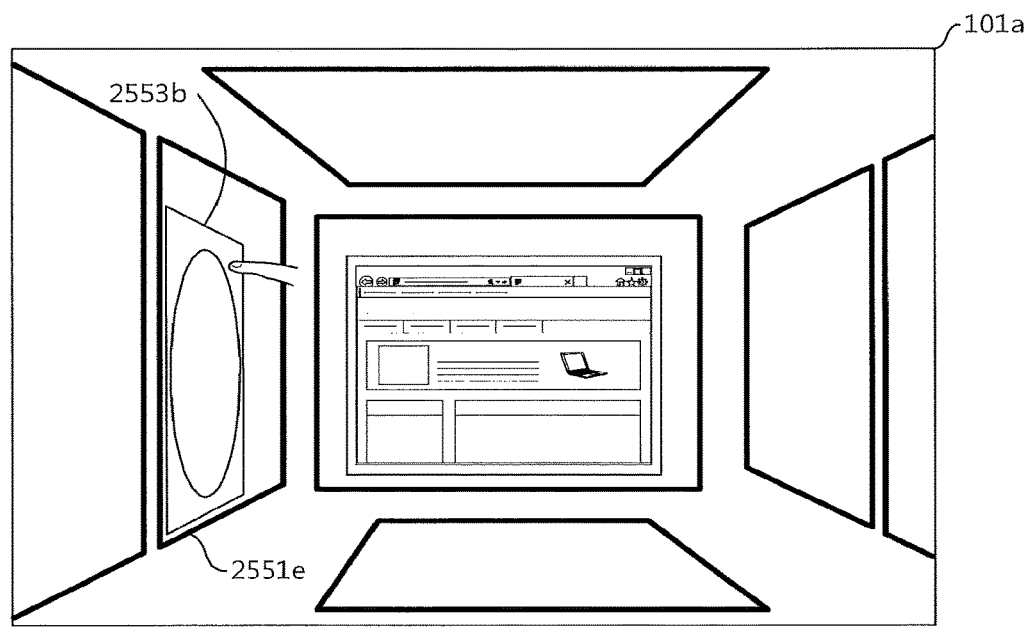
FIG. 29 is a diagram depicting an example of a drag operation.

FIG. 29 illustrates an example in the beginning of the drag operation. The projected window 2553*b* is rendered in the display area 2551*e*. In this example, the projected window 2553*b* is dragged inside a range of the display area 2551*e*. When the user drops at this position, the projected window 2553*b* remains in the place. At this time, the window 103*b* also moves on the original screen of the display surface 101*e* corresponding to the display area 2551*e*. That is, the movement in the display area 2551*e* of the operation screen is synchronized with the movement in the original screen of the display surface 101*e*.

Returning to FIG. 28, the processing at the beginning of dragging will be explained. The update unit 2307 determines whether or not the display ID identified in the immediately preceding identification processing matches the display ID stored in S2401 (S2803). In the example of FIG. 29, it is determined that the display ID identified in the immediately preceding identification processing matches the display ID stored in S2401. Then, the update unit 2307 updates the management data (S2805). Specifically, the update unit 2307 changes the window position in the record corresponding to the window ID identified in the immediately preceding identification processing. Specifically, the update unit 2307 calculates a movement vector whose start point is the touch position in the original coordinate system, which was stored in S2401, and whose end point is the touch point in the original coordinate system which was identified in the immediately preceding identification processing. Then, the update unit 2307 adds a movement vector to the window position.

Figure 30:
FIG. 30 is a diagram depicting an example of update of the management data.

FIG. 30 illustrates an example of update of the management data. The upper part of FIG. 30 illustrates the management data before the drag operation illustrated in FIG. 29 is performed. At this point, the position of the original window 103*b* corresponding to the projected window 2553*b* is (X2, Y2).

The lower part of FIG. 30 illustrates the management data after the drag operation illustrated in FIG. 29 was performed. At this point, the position of the original window 103*b* corresponding to the projected window 2553*b* is (X4, Y4). Other data has not changed.

Returning to the explanation of FIG. 28, the window system 405 renders the original screen corresponding to the display ID identified in the immediately preceding identification processing, and stores it in the original screen storage unit 409 (S2807). The display processing unit 411 corresponding to the display ID displays the rendered original screen on the display device 207 identified by the display ID (S2809).

The planar projection unit 421 executes the planar projection processing on the rendered original screen (S2811). The display processing unit 411 corresponding to the control display causes the display device 207 to display the operation screen (S2813).

The acceptance unit 501 obtains the next event (S2829). The identification unit 503 executes the identification processing as described above (S2831). The acceptance unit 501 determines whether or not the number of times of touches, which is represented by the obtained event, is 1 (S2833). When the number of times of touches, which is represented by the obtained event, is 1, the processing returns to the processing illustrated in S2801 and the aforementioned processing is repeated.

Figure 31:
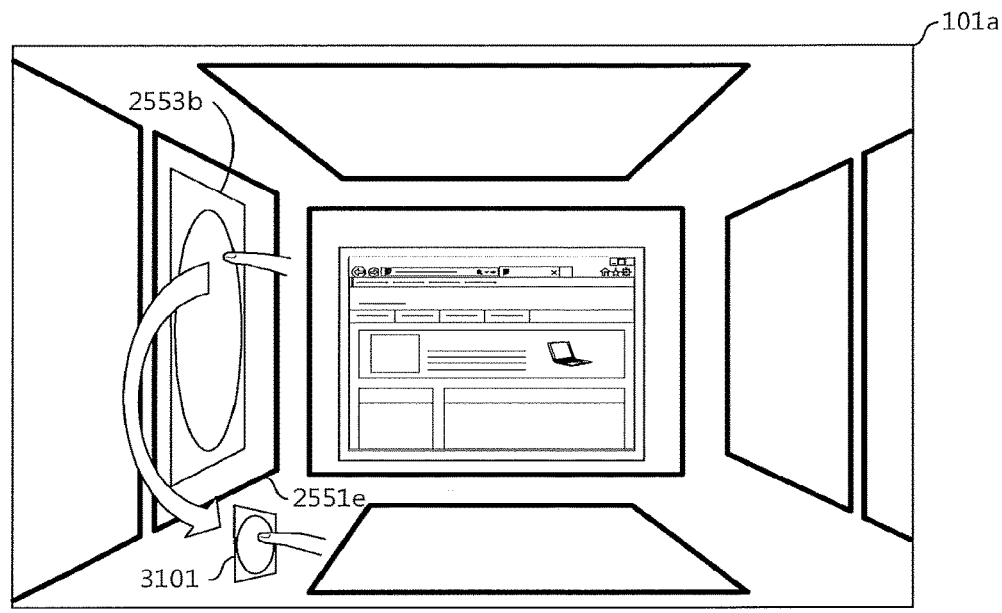
FIG. 31 is a diagram depicting an example of the drag operation.

Next, a case where the touch position moves out of the display area due to dragging will be explained. FIG. 31 illustrates an example in which the touch position moves out of the display area 2551*e*. In this example, the projected window 2553*b* is dragged to an outside the display area 2551*e*. In this state, outside the display area 2551*e*, an icon 3101 is rendered at the touch position. The projected window 2553*b* has returned to its original position. When the user drops at this position, the icon 3101 disappears. At this time, also on the original screen of the display surface 101*e* corresponding to the display area 2551*e*, the window 103*b* returns to the original position in the same manner. That is, the movement in the display area 2551*e* of the operation screen is synchronized with the movement of the original screen of the display surface 101*e*.

Returning to FIG. 28, processing in a case where the touch position moves out of the display area by dragging will be explained. In the example of FIG. 31, it is determined to be "outside display area" in S2801.

The update unit 2307 updates the management data (S2815). Specifically, the update unit 2307 identifies a record in the management data based on the display ID and the window ID stored in S2401, and updates the window position in the record to an initial value based on the saved management data.

The placement unit 2305 arranges the icon 3101 in the touch position (projection coordinate system) of the operation screen (S2817). The display processing unit 411 corresponding to the control display causes the display device 207 to display the operation screen (S2819). The placement unit 2305 deletes the icon 3101 (S2821). While the touch position is outside the range of the display area 2551*e* due to dragging, it passes through a route of S2815 to S2821. The processing of S2815 may be omitted once it is executed.

The acceptance unit 501 obtains an event (S2829). The identification unit 503 executes the identification processing as described above (S2831). The acceptance unit 501 determines whether or not the number of times of touches, which is represented by the obtained event, is 1 (S2833). When the number of times of touches represented by the obtained event is 1, the processing returns to the processing illustrated in S2801 and the aforementioned processing is repeated.

Figure 32:
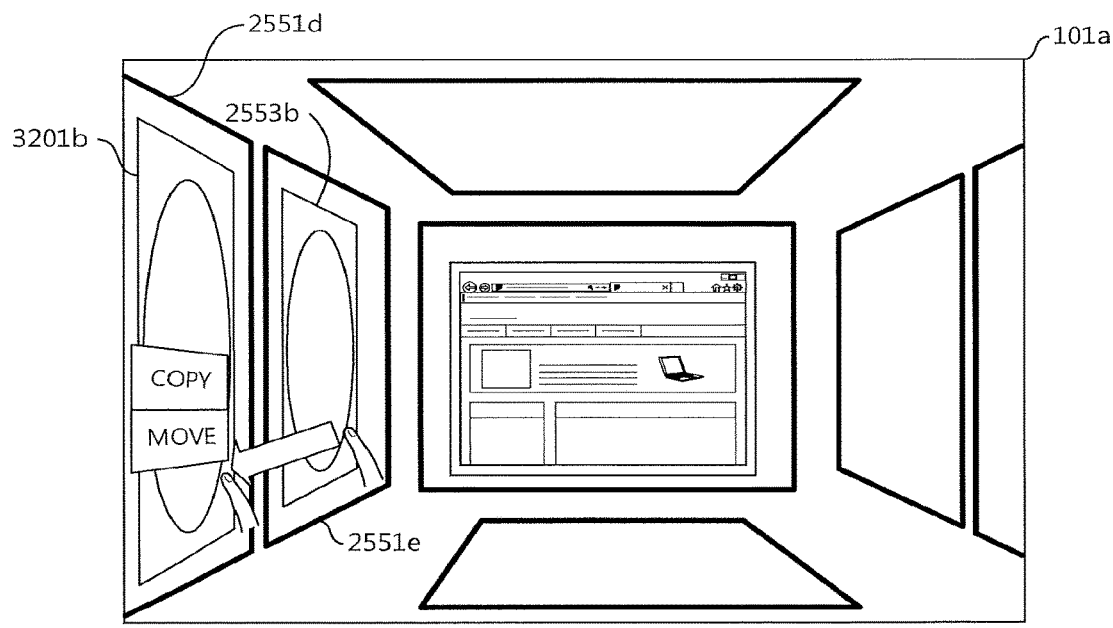
FIG. 32 is a diagram depicting an example of the drag operation.

Next, a case where a touch position shifts to another display area by dragging will be explained. FIG. 32 illustrates an example in which the touch position moves to the adjacent display area 2551d. This example represents a state in which the projected window 2553b is dragged to the adjacent display area 2551d. When the user drops at this position, the window 3201b remains in the place.

Then, a menu for selecting "copy" or "move" is displayed. When "copy" is selected, the original window 2553b remains in the place. At this time, similarly the window 103b remains in the original screen of the display surface 101e corresponding to the display area 2551e. When "move" is selected, the original window 2553b disappears. At this time, the window 103b disappears also in the original screen of the display surface 101e. In this manner, the movement in the display area 2551e of the operation screen is synchronized with the movement in the original screen of the display surface 101e.

Moreover, the movement in the display area 2551d of the operation screen is synchronized with the movement in the original screen of the display surface 101d. That is, the original window 103b corresponding to the projected window 3201b is rendered on the display surface 101d.

Returning to FIG. 28, processing in a case where the touch position is moved to another display area by dragging will be explained. In the example of FIG. 32, it is determined not to be "outside display area" in S2801. In addition, in S2803, it is determined that the display ID identified in the immediately preceding identification processing does not match the display ID stored in S2401.

Then, the update unit 2307 updates the management data (S2823). Specifically, the update unit 2307 adds a record corresponding to a new window in the display area that is the drag destination. For the display ID of the new record, the display ID identified by the immediately preceding identification processing is set. The window ID, the application ID, the window size and the layer number of the new record are set to the same values as those of the original record identified by the window ID and display ID stored in S2401. The layer number may be "1". In addition, any position in the window is set as the window position. At this time, a relative relationship between a window frame and the touch position may be maintained.

Figure 33:
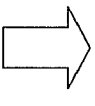
FIG. 33 is a diagram depicting an example of update of the management data.

FIG. 33 illustrates an example of update of the management data. The upper part of FIG. 33 illustrates the management data before the drag operation illustrated in FIG. 32 is performed. At this point, the number of windows 103 is two.

The lower part of FIG. 33 illustrates the management data after the drag operation illustrated in FIG. 32 was performed. The number of windows 103 is three. A third record having the same ID as the ID "WIN-2" of the window 103b corresponding to the projected window 2553b is added. The third record corresponds to the window 3201b. The application ID "APL-2", the window size (W2, H2) and the layer number "1" in the added record are the same as those in the second record corresponding to the projected window 2553b. However, the display ID "DSP-D" and the window position (X5, Y5) are different from those in the second record.

The window system 405 renders the original screen corresponding to the display ID identified in the immediately preceding identification processing and stores it in the original screen storage unit 409 (S2825). The display processing unit 411 corresponding to the display ID identified in the immediately preceding identification processing displays the rendered original screen on the display device 207 identified by the display ID (S2827).

The planar projection unit 421 executes the planar projection processing for the rendered original screen (S2811). The display processing unit 411 corresponding to the control display causes the display device 207 to display the operation screen (S2813).

The acceptance unit 501 obtains the next event (S2829). The identification unit 503 executes the identification processing as described above (S2831). The acceptance unit 501 determines whether or not the number of times of touches, which is represented by the obtained event, is 1 (S2833). When the number of times of touches, which is represented by the obtained event, is 1, the processing returns to the processing illustrated in S2801 and the aforementioned processing is repeated.

Figure 35:
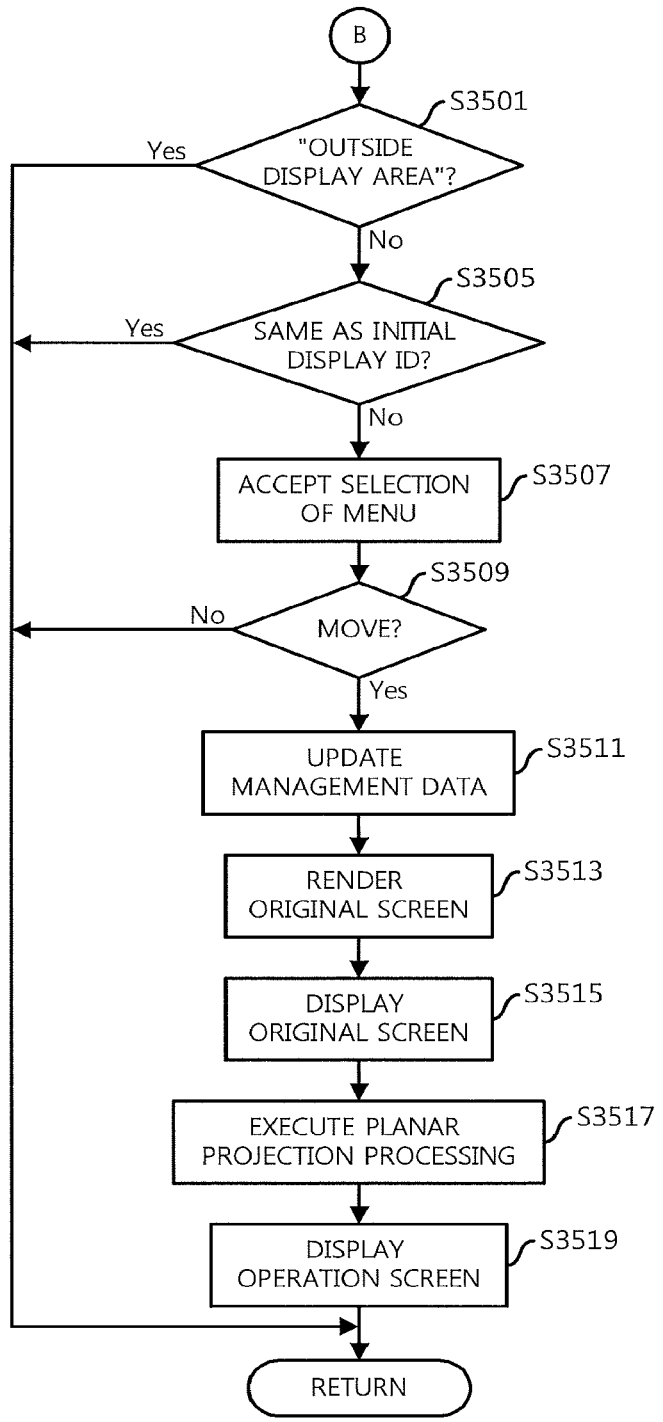
FIG. 35 is a diagram depicting an example of a flow for the window operation processing.

Next, processing when a drop operation is performed will be explained. When the drop operation is performed, it is determined in S2833 that the number of times of touches is not 1. Then, the processing shifts to S3501 illustrated in FIG. 35 via terminal B. Here, it is not assumed that the number of times of touches is 2 or more.

First, as illustrated in FIG. 29, a case where dropping is performed when a touch position is staying inside the display area will be explained. In this case, in S3501 of FIG. 35, the update unit 2307 determines that a result of the immediately preceding identification processing is not "outside display area". Furthermore, the update unit 2307 determines that the display ID identified in the immediately preceding identification processing matches the display ID stored in S2401 (S3505). Then, the window operation processing is completed as it is.

Next, as illustrated in FIG. 31, a case where dropping is performed when a touch position is outside the display area 2551e will be explained. In this case, in S3501 of FIG. 35, the update unit 2307 determines that the result of the immediately preceding identification processing is "outside display area". Then, the window operation processing is completed as it is.

Next, a case where dropping is performed when a touch position is moved to another display area 2551 by dragging as illustrated in FIG. 32 will be explained. In this case, in S3501 of FIG. 35, the update unit 2307 determines that the result of the immediately preceding identification processing is not "outside display area". In addition, the update unit 2307 determines that the display ID identified in the immediately preceding identification processing does not match the display ID stored in S2401 (S3505). The acceptance unit 501 displays a menu near the touch position and accepts selection of "copy" or "move" (S3507).

In S3509, when the acceptance unit 501 determined that "move" is not selected, that is, when "copy" is selected, the window operation processing is completed as it is.

On the other hand, when the acceptance unit 501 determines that "move" is selected, the update unit 2307 updates the management data (S3511). Specifically, the update unit 2307 specifies the original record in the management data based on the display ID and window ID stored in S2401, and deletes the record.

Figure 34:
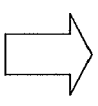
FIG. 34 is a diagram depicting an example of update of the management data.

FIG. 34 illustrates an example of update of management data. The upper part of FIG. 34 is the same as the lower part of FIG. 33. The lower part of FIG. 34 illustrates the management data in the case where "move" is selected in the menu illustrated in FIG. 32. The second record corresponding to the original window 2553b is deleted.

The window system 405 renders the original screen corresponding to the display ID stored in S2401 and stores it in the original screen storage unit 409 (S3513). The display processing unit 411 corresponding to the display ID causes the display device 207 to display the original screen (S3515). Furthermore, the planar projection unit 421 executes the planar projection processing on the rendered original screen (S3517). The display processing unit 411 corresponding to the control display causes the display device 207 to display the operation screen (S3519). Then, the window operation processing is completed.

According to this embodiment, it is possible to operate the original screen on the operation screen.

In addition, by using the second nomography matrix, it is possible to more correctly convert positions in the display area into positions in the original screen.

In addition, convenience of window operation on a remote display surface become improved. For example, operability such as movement and copying of windows on a remote display surface become improved. For example, it is easy to change the display layer of the window on the remote display surface.

[Embodiment 2]

In this embodiment, an example of providing plural scenes will be explained.

Figure 36:
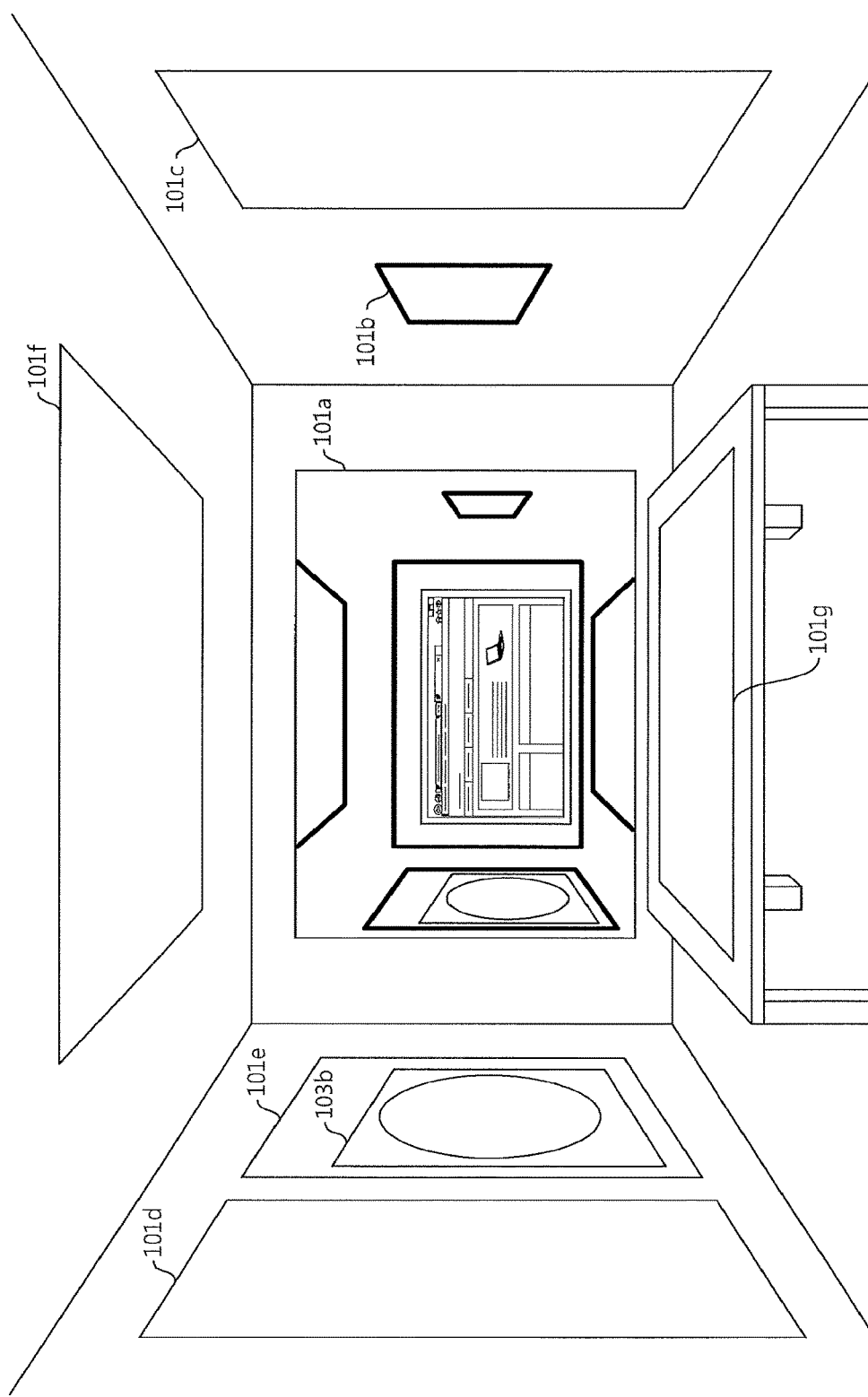
FIG. 36 is a diagram depicting an example of arrangement of display surfaces and an example of display of the operation screen.

FIG. 36 illustrates an example of arrangement of display surfaces and an example of display of the operation screen. In this example, it is assumed that the display surface 101b is smaller than the aforementioned example. In this example, a perspective view generated by a model corresponding to the actual display surface 101b is rendered on the operation screen.

Figure 37:
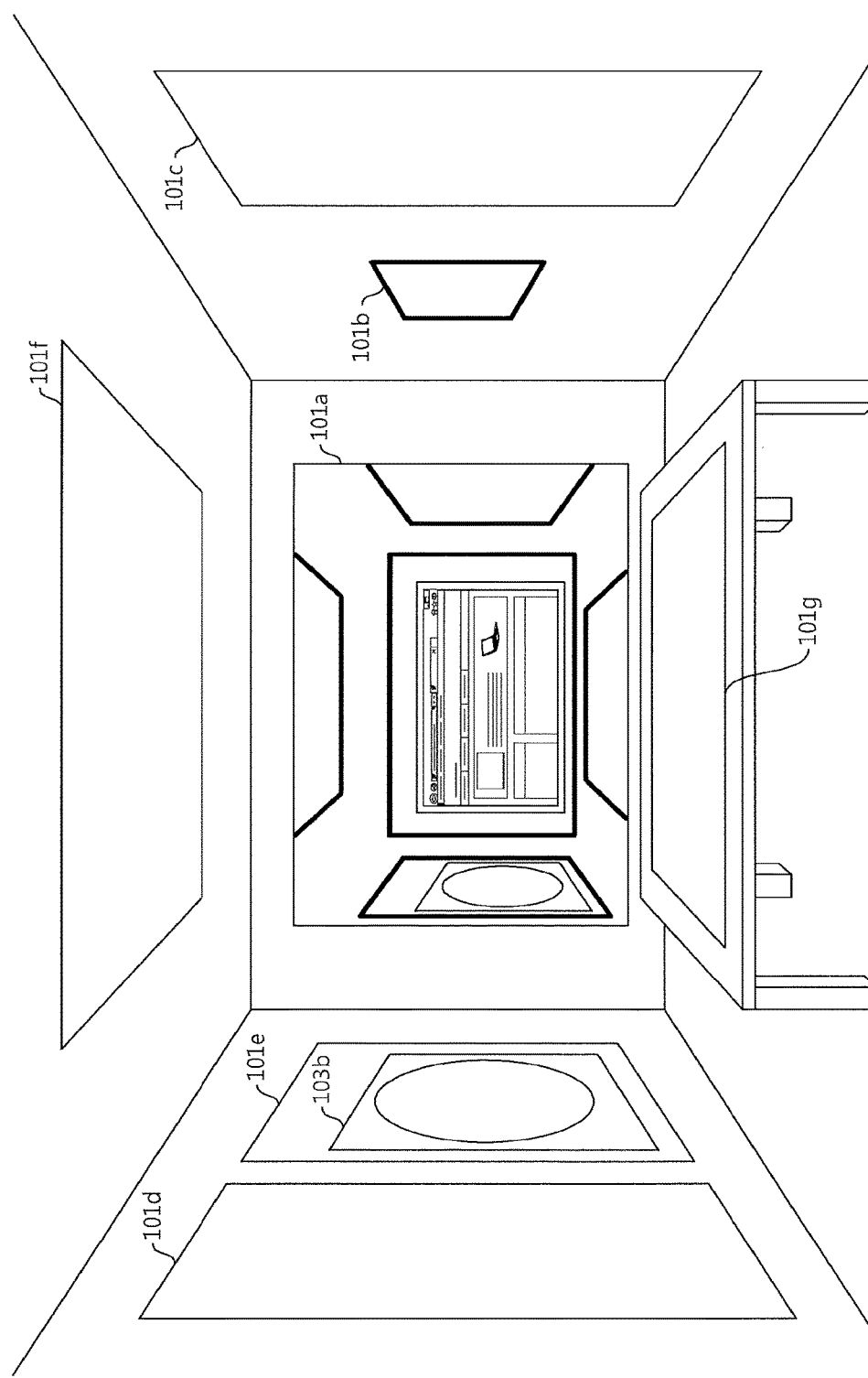
FIG. 37 is a diagram depicting an example of arrangement of the display surfaces and an example of display of the operation screen.

FIG. 37 illustrates an example of display of another operation screen. In this example, a perspective view generated by a virtual model larger than the actual display surface 101b is rendered on the operation screen.

In this manner, plural models are set for one display surface 101. Therefore, in the coordinates storage unit 429, four corner positions corresponding to each model are stored. In the scene storage unit 415, scene data using each model is stored.

Then, when a tap operation or a long press operation is performed on the display area corresponding to the display surface 101b, scenes to be used are switched and the four corner positions to be used are switched.

Figure 38:
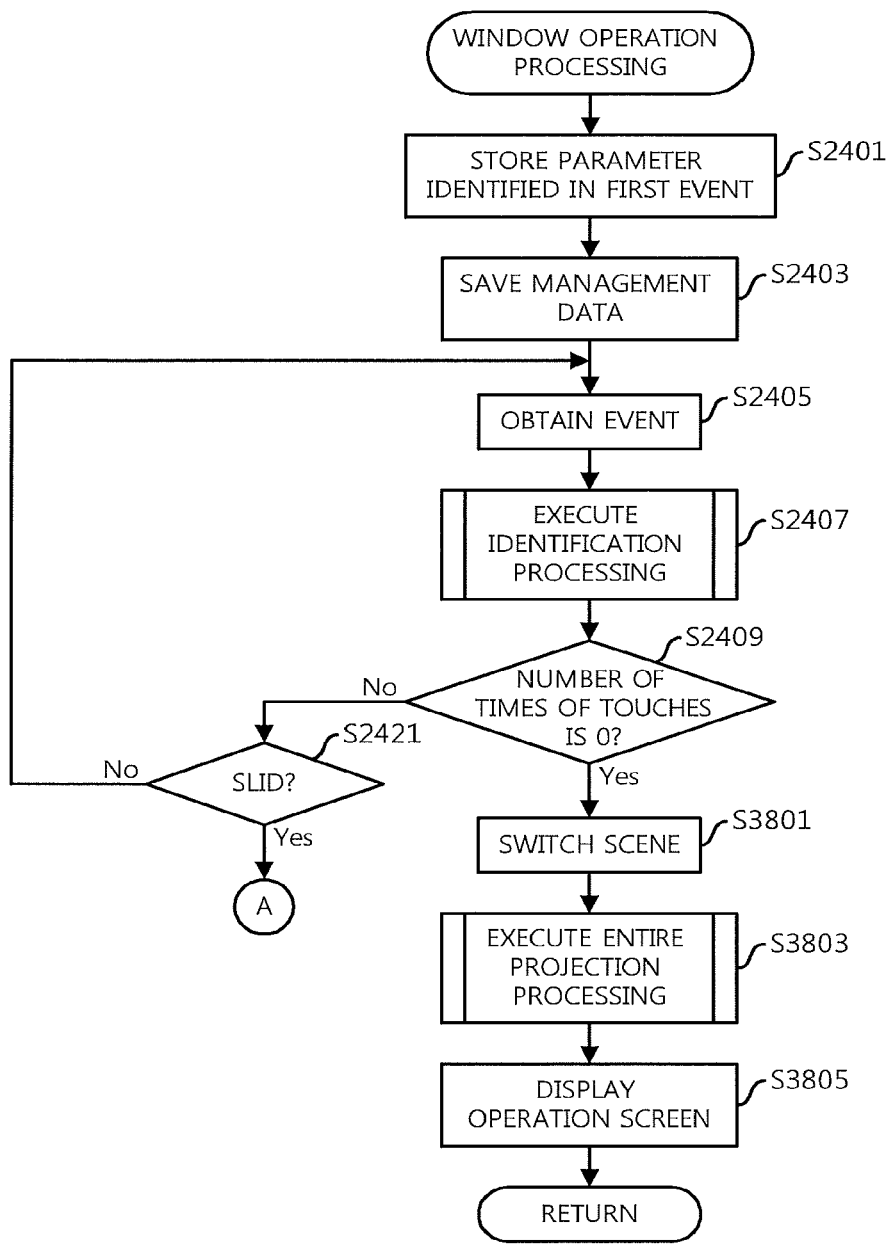
FIG. 38 is a diagram depicting an example of a flow for the window operation processing.

FIG. 38 illustrates an example of a flow for the window operation processing. The processing of S2401 to S2409 is the same as in the case of FIG. 24. The processing of S2421 is also the same as in the case of FIG. 24.

In S2409, when it is determined that the number of times of touches, which is represented by the event obtained in S2405, is 0, the second conversion unit 901 switches the scene (S3801). Then, the projection mode unit 413 executes the entire projection processing (S3803). At this time, perspective projection processing is performed based on the switched scene. The display processing unit 411 corresponding to the control display causes the display device 207 to display the operation screen (S3805). In S1103 illustrated in FIG. 11, the calculation unit 425 uses four corner positions corresponding to the switched scene.

In this way, even when the actual display surface 101 is small, it is possible to increase the display area on the operation screen and to improve operability.

[Embodiment 3]

In this embodiment, an example in which a virtual display surface 101 is provided will be explained.

Figure 39:
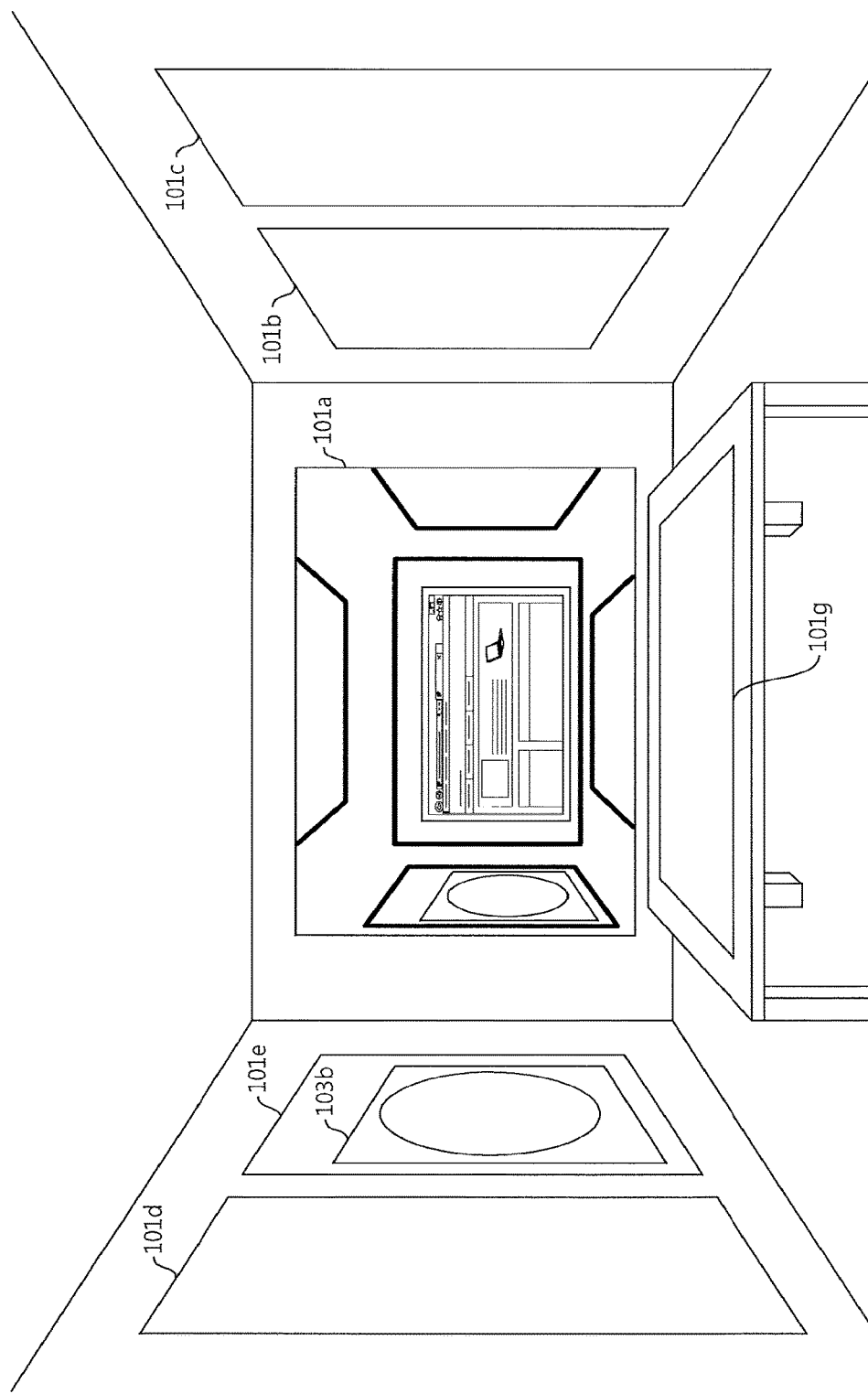
FIG. 39 is a diagram depicting an example of arrangement of the display surfaces and an example of display of the operation screen.

FIG. 39 illustrates an example of arrangement of the display surfaces and an example of display of the operation screen. In this example, there is not the touch screen 205f that provides the display surface 101f. However, the perspective view generated by the model corresponding to the virtual display surface 101f is rendered on the operation screen.

By setting a model corresponding to the virtual display surface 101 in this way, it is possible to provide a virtual display area on the operation screen. The display processing unit 411 corresponding to the virtual display surface 101 may not be provided.

In this way, for example, it is possible to use a virtual display area on the operation screen as a temporary evacuation area of the window.

In the display system described above, it is assumed that various cooperative operations are performed between a mobile terminal device and the display control apparatus 203. For example, a mobile terminal device and the display control apparatus 203 may perform various cooperative operations according to a cooperation request from the mobile terminal device to the display control apparatus 203. The display control apparatus 203 may detect the mobile terminal device of a person who entered a room and automatically distribute specific programs to the mobile terminal device. The mobile terminal device may automatically activate the received specific programs. The mobile terminal device and the display control apparatus 203 may synchronize data and processes. Processing in the display control apparatus 203 may be controlled by operation in the mobile terminal device, or processing in the mobile terminal device may be controlled by the operation in the display control apparatus 203.

Although the embodiments of this invention were explained above, this invention is not limited to those. For example, the aforementioned functional block configuration does not always correspond to actual program module configuration.

Moreover, the aforementioned configuration of each storage area is a mere example, and may be changed. Furthermore, as for the processing flow, as long as the processing results do not change, the turns of the steps may be exchanged or the steps may be executed in parallel.

In addition, the aforementioned display control apparatus 203 is a computer apparatus as illustrated in FIG. 40. That is, a memory 2501, a CPU 2503 (central processing unit), a HDD (hard disk drive) 2505, a display controller 2507 connected to a display device 2509, a drive device 2513 for a removable disk 2511, an input unit 2515, and a communication controller 2517 for connection with a network are connected through a bus 2519 as illustrated in FIG. 40. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In these embodiments of this invention, the application program to realize the aforementioned processing is stored in the computer-readable, non-transitory removable disk 2511 and distributed, and then it is installed into the HOD 2505 from the drive device 2513. It may be installed into the HDD 2505 via the network such as the Internet and the communication controller 2517. In the computer apparatus as stated above, the hardware such as the CPU 2503 and the memory 2501, the OS and the application programs systematically cooperate with each other, so that various functions as described above in details are realized.

The aforementioned embodiments are summarized as follows.

A display method related to embodiments includes: projecting data of a space that includes a first display provided by a first display device to a perspective view; causing a second display device to display the perspective view on a second display; accepting a designation of a first position on the second display; converting the first position into a second position on the first display, upon detecting that the first position is inside an area that corresponds to the first display; and operating an image displayed on the first display based on the second position.

In this way, operability with respect to plural displays is improved. In other words, it is possible to operate, on the perspective view displayed on the second display, the image displayed on the first display.

Furthermore, the display method may further include calculating conversion values for converting positions in a coordinate system for the second display into positions in a coordinate system for the first display, based on a relationship between coordinates of a reference point in the first display and coordinates of a point that is in the area and corresponds to the reference point. And the converting may include converting the first position into the second position by using the calculated conversion values.

In this way, it is possible to convert the first position into the second position more correctly.

The operating may include operating a window included in the image. In this way, convenience when carrying out window operation on a remote display is improved.

The operating may include updating a position of the window.

In this way, operability of operation such as movement and copying of the window on the remote display is improved.

The operating may include updating a display layer of the window.

This makes it easy to change the display layer of the window on the remote display.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A display method, comprising:
   projecting, by using a computer, data of a space to a perspective view, wherein the space includes a first display provided by a first display device and a second display provided by a second display device located apart from the first display;
   causing, by using the computer, a third display device to display the perspective view on a third display;
   accepting, by using the computer, a touch input selecting a first position on the third display;
   converting, by using the computer, the first position into a second position on the first display, upon detecting that the first position is inside an area that corresponds to the first display;
   identifying, by using the computer, an object based on the second position, upon detecting that the second position is inside an area that corresponds to the object;
   upon detecting that the touch input was slid on the third display and the object was dropped at a third position inside an area that corresponds to the second display on the third display, converting, by using the computer, the third position to a fourth position on the second display; and
   changing, by using the computer, an image displayed on the second display based on the object at the fourth position.

2. A non-transitory computer-readable storage medium storing a program that causes a computer to execute a process, the process comprising:
   projecting data of a space to a perspective view, wherein the space includes a first display provided by a first display device and a second display provided by a second display device located apart from the first display;
   causing a third display device to display the perspective view on the third display;
   accepting a touch input selecting a first position on the third display;
   converting the first position into a second position on the first display, upon detecting that the first position is inside an area that corresponds to the first display;
   identifying an object based on the second position, upon detecting that the second position is inside an area that corresponds to the object;
   upon detecting that the touch input was slid on the third display and the object was dropped at a third position inside an area that corresponds to the second display on the third display, converting the third position to a fourth position on the second display; and
   changing an image displayed on the second display based on the object at the fourth position.

3. A display control apparatus, comprising:
   a memory; and
   a processor coupled to the memory and configured to:
      project data of a space to a perspective view, wherein the space includes a first display provided by a first display device and a second display provided by a second display device located apart from the first display;
      cause a third display device to display the perspective view on the third display;
      accept a touch input selecting a first position on the third display;
      convert the first position into a second position on the first display, upon detecting that the first position is inside an area that corresponds to the first display;
      identify an object based on the second position, upon detecting that the second position is inside an area that corresponds to the object;
      upon detecting that the touch input was slid on the third display and the object was dropped at a third position inside an area that corresponds to the second display on the third display, convert the third position to a fourth position on the second display; and change an image displayed on the second display based on the object at the fourth position.

\* \* \* \* \*